(12) United States Patent
Dhodapkar et al.

(10) Patent No.: US 10,909,525 B1
(45) Date of Patent: Feb. 2, 2021

(54) ACCOUNT ACTIONS BASED ON INTERACTIONS WITH NFC-ENABLED CARD

(71) Applicant: Square, Inc., San Francisco, CA (US)

(72) Inventors: Ashutosh Sham Dhodapkar, Fremont, CA (US); Dino Dai Zovi, Brooklyn, NY (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 16/698,302

(22) Filed: Nov. 27, 2019

(51) Int. Cl.
*G06Q 20/32* (2012.01)
*G06Q 20/42* (2012.01)
*G06Q 20/36* (2012.01)

(52) U.S. Cl.
CPC ..... *G06Q 20/3278* (2013.01); *G06Q 20/3223* (2013.01); *G06Q 20/3276* (2013.01); *G06Q 20/3672* (2013.01); *G06Q 20/42* (2013.01)

(58) Field of Classification Search
CPC ........... G06Q 20/3278; G06Q 20/3223; G06Q 20/3276; G06Q 20/3672; G06Q 20/42
See application file for complete search history.

(56) References Cited

U.S. PATENT DOCUMENTS

| | | | |
|---|---|---|---|
| 8,316,237 B1* | 11/2012 | Felsher ................. | H04L 9/0825 713/171 |
| 9,092,777 B1* | 7/2015 | Gaspar ................. | G06Q 20/385 |
| 10,026,076 B2* | 7/2018 | Kumar ................. | G06Q 20/223 |
| 2008/0091944 A1* | 4/2008 | von Mueller ......... | G06F 21/606 713/168 |
| 2011/0218880 A1* | 9/2011 | Hammad ............... | G06Q 40/02 705/26.41 |
| 2012/0240195 A1* | 9/2012 | Weiss .................... | H04L 63/107 726/4 |
| 2012/0259782 A1* | 10/2012 | Hammad ............. | G06Q 20/382 705/44 |
| 2013/0200999 A1* | 8/2013 | Spodak ................ | G06Q 20/347 340/5.65 |

(Continued)

OTHER PUBLICATIONS

"A Secure Mobile Payment System using QR Code"; Sana Nseir, Nael Hirzallah, Musbah Aqel; (Year: 2013).*

(Continued)

*Primary Examiner* — Patrick McAtee
*Assistant Examiner* — Edgar R Martinez-Hernandez
(74) *Attorney, Agent, or Firm* — Baker Botts L.L.P.

(57) ABSTRACT

In one embodiment, a method includes receiving, from a computing device of a first user, a request to transfer funds from a first account associated with the first user to a second account associated with a second user. The request to transfer funds may be generated by receiving a first token at the computing device of the first user through near-field communication with a first payment card and determining that the first token is associated with the second user. The method includes sending, in response to receiving the request to transfer funds, to the computing device of the first user, a request to authorize the transfer to the second account associated with the second user. The method includes receiving, from the device of the first user, an indication of authorization, wherein the indication of authorization is generated by receiving a second token at the device of the first user.

20 Claims, 15 Drawing Sheets

(56) References Cited

U.S. PATENT DOCUMENTS

| | | | | |
|---|---|---|---|---|
| 2014/0025519 | A1* | 1/2014 | Thomas | H04L 51/16 |
| | | | | 705/21 |
| 2015/0294304 | A1* | 10/2015 | Donnellan | G06Q 20/3276 |
| | | | | 705/44 |
| 2017/0076291 | A1* | 3/2017 | Cairns | G06Q 20/3278 |
| 2017/0206524 | A1* | 7/2017 | Sheets | G06Q 20/401 |
| 2019/0034921 | A1* | 1/2019 | Hammad | G06Q 20/204 |
| 2019/0266587 | A1* | 8/2019 | Lin | G06Q 20/32 |
| 2019/0392424 | A1* | 12/2019 | Wilson | G06Q 20/20 |

OTHER PUBLICATIONS

"Single_Sign-On_Model_for_Web Services"; Lata Kiran; Sandeep Sood, Dr Kuldip Singh; (Year: 2009).*

* cited by examiner

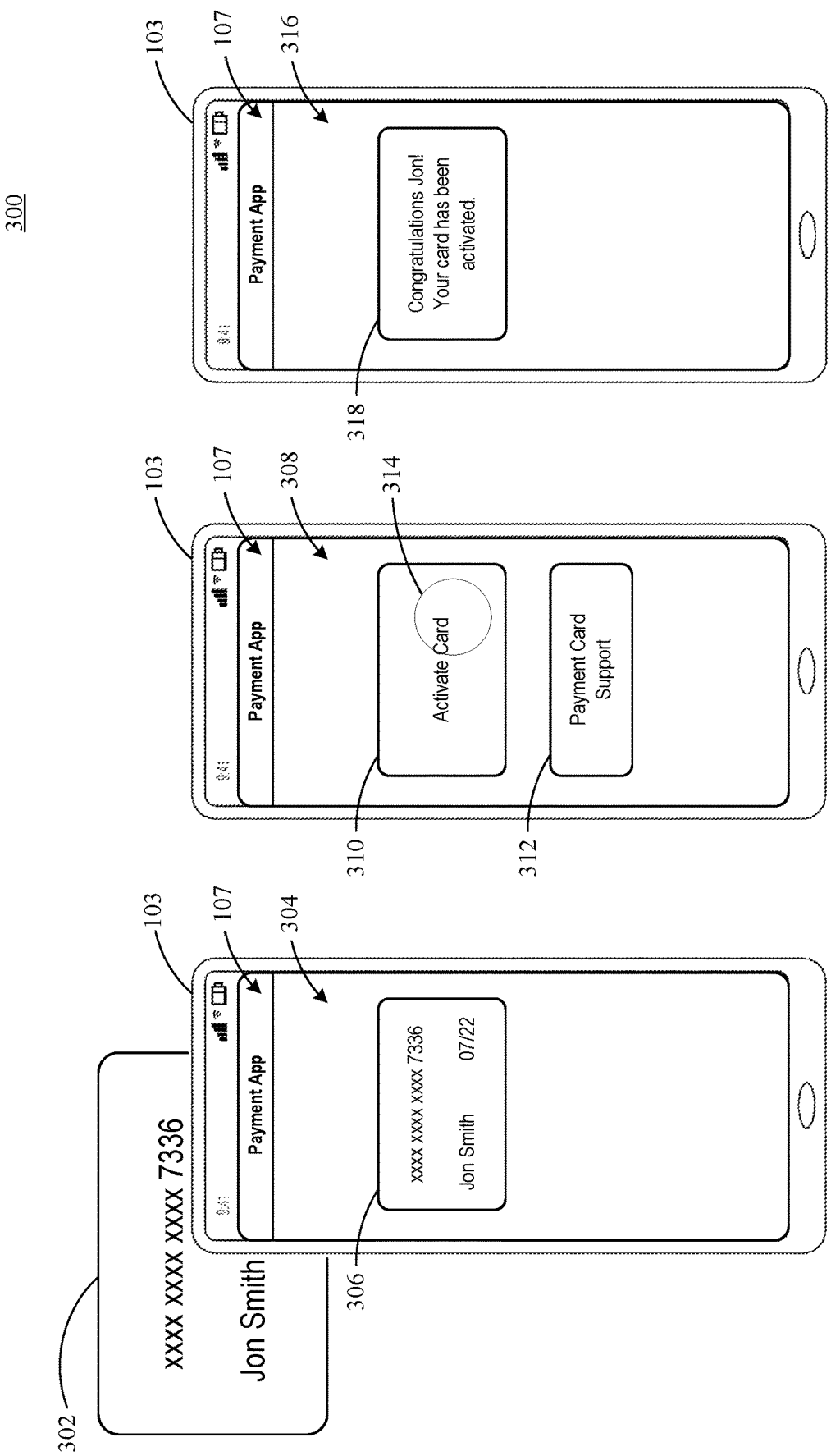

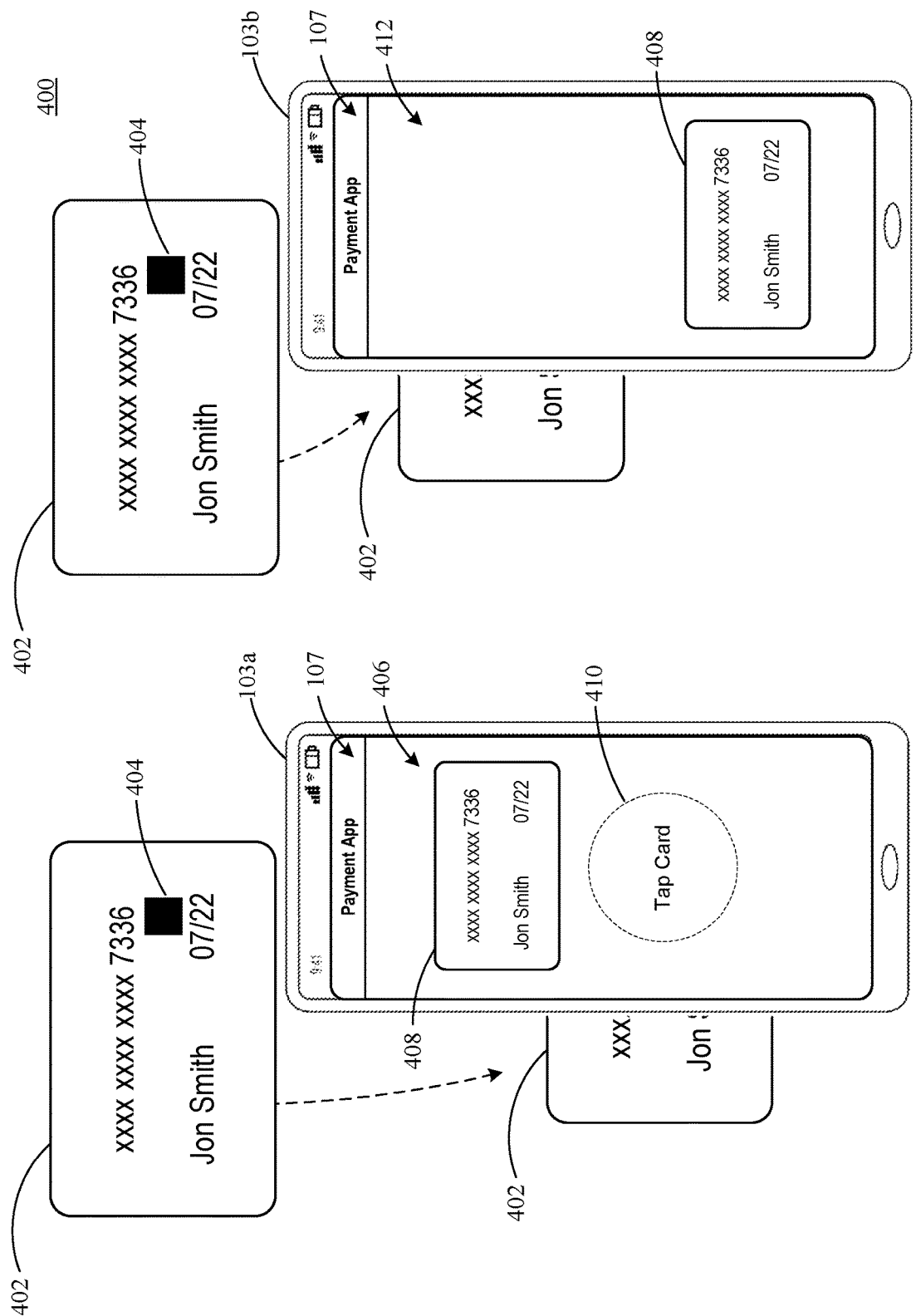

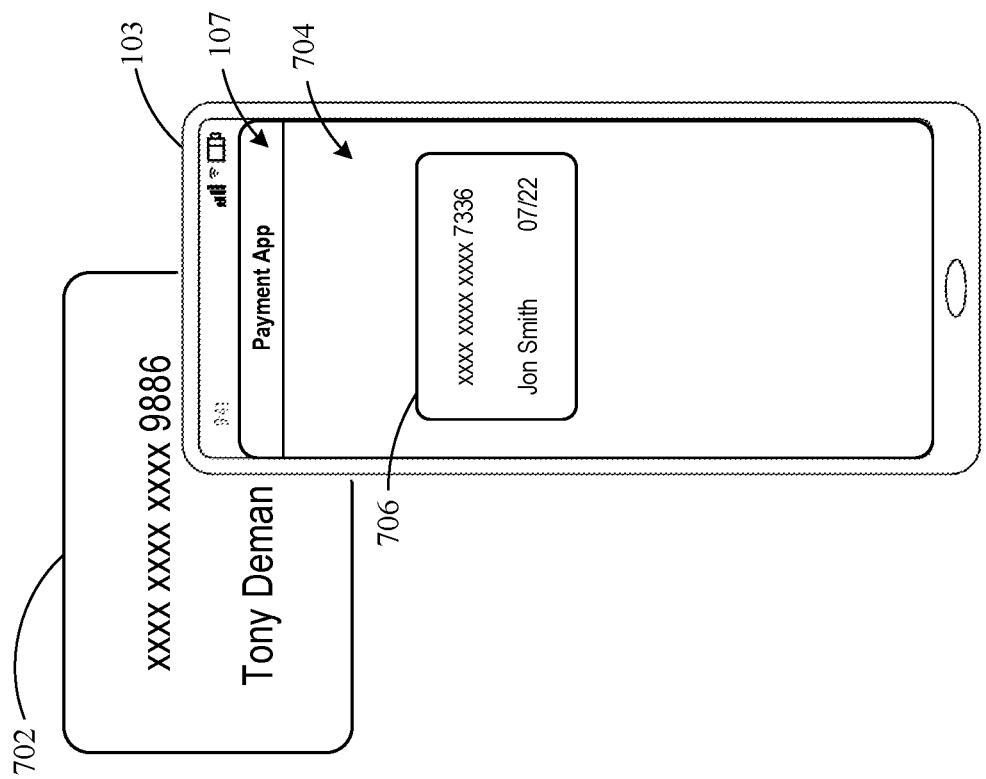
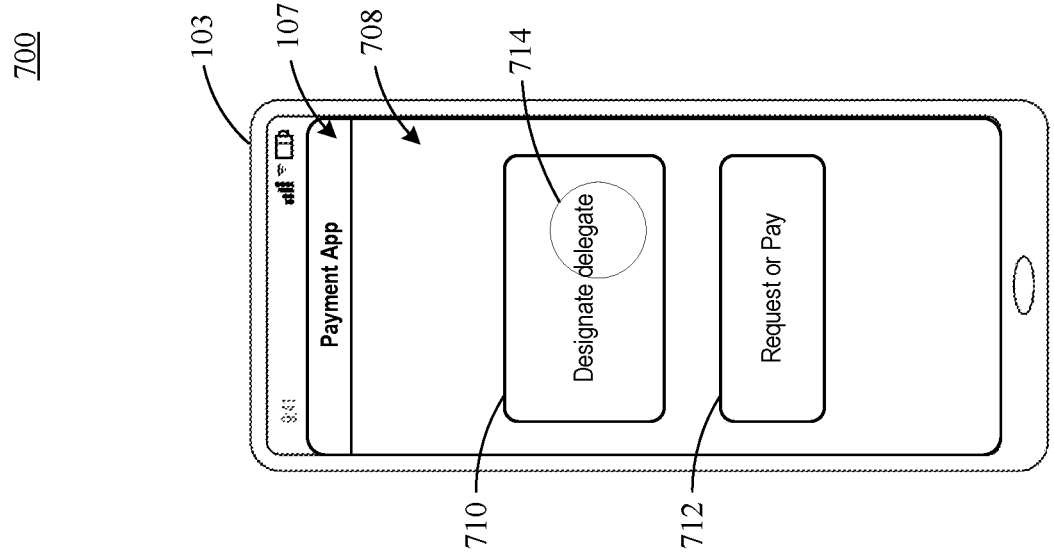
FIG. 7A
FIG. 7B

ACCOUNT ACTIONS BASED ON INTERACTIONS WITH NFC-ENABLED CARD

BACKGROUND

Near-field communication (NFC) is a set of communication protocols that enable two electronic devices, one of which is usually a portable device such as a smartphone, to establish communication by bringing them within close proximity of each other. NFC offers a low-speed connection with simple setup that can be used to bootstrap more capable wireless connections. NFC-enabled devices have a variety of use cases. NFC is used for file sharing including sharing photos and videos. NFC is used for social networking, for example for sharing contacts and contact information. NFC-enabled devices can act as electronic identity documents and keycards. NFC devices are also used in contactless payment systems, similar to those used in credit cards and electronic ticket smart cards and allow mobile payment to replace or supplement these systems. This is sometimes referred to as NFC/CTLS (contactless) or CTLS NFC.

BRIEF DESCRIPTION OF THE DRAWINGS

FIGS. 3A-3C illustrate example user interfaces relating to performing an account action associated with a received token.

FIGS. 4A-4B illustrate example user interfaces relating to identifying where to scan a payment card.

FIGS. 7A-7D illustrate example user interfaces relating to performing an account action associated with a received token.

DESCRIPTION OF EXAMPLE EMBODIMENTS

Figure 1:
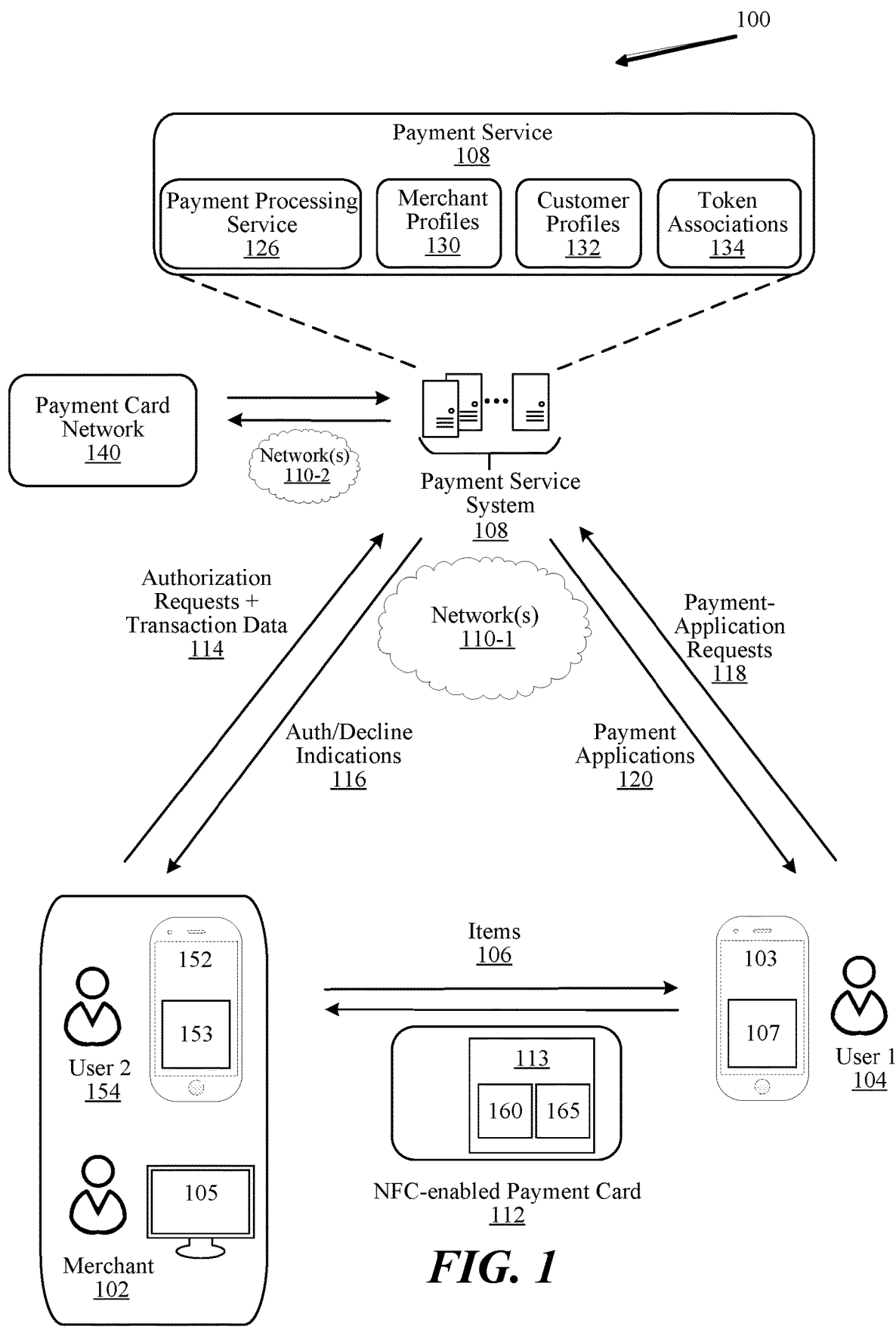
FIG. 1 illustrates an example payment service system network.

Particular embodiments described herein enable a user to specify actions to be performed by a computing system or systems when a token is received through short-range communication, for example through near-field communication (NFC). Particular embodiments described herein enable a user to register or activate a payment card corresponding to a received token. Upon receiving a token associated with a payment card through NFC, a payment service system can provide different functions to the user corresponding to a user account associated with the payment card or token by the payment service system. In particular embodiments, actions that may be performed may include manipulation of or interaction with a user account associated with the user, such as a payment account.

In particular embodiments, payment cards may comprise an NFC chip embedded thereon. This may be referred to as an NFC-enabled payment card. This NFC chip may be encoded with data as an NFC tag via NFC Data Exchange Format (NDEF) messages. The NDEF messages or NFC tags are programmable and may include multiple data records. As an example and not by way of limitation, the NFC chip may include a payment application that runs in parallel to a programmable NFC tag that includes a token associated with a payment card and a particular user account of a payment service. The NFC tag may further include programmable instructions for an application capable of interpreting the NFC tag. When a user attempts to perform a transaction with a payment card comprising the programmable NFC tag, the user may tap the payment card to a point-of-sale (POS) device that has an NFC reader, is connected to an NFC reader, or is connected to a device that has an NFC reader.

When the payment card comes into close proximity to the NFC reader, the device uses the NFC reader to read the data stored by the NFC chip. Messages may be exchanged between the NFC reader and the NFC chip. In particular embodiments, the software on the POS device may select the payment application. The payment application on the NFC chip may be adhere to industry standards for allow for contactless or NFC payments. The device may then communicate with a payment service system to process the transaction by sending necessary data (e.g., a payment token) received from the payment application. The payment service system may process the data and facilitate a transfer of funds from a user account associated with the received token and the user account associated with the POS device. In particular embodiments, the software on the POS device may select the NFC tag (running parallel to the payment application). The POS device and NFC chip may be dual-function, allowing for payment processing via the payment application and processing using the NFC tag (and the data stored therein) according to the disclosed embodiments. Said processing may include payment processing using specialized payment functions and may also include context-based actions. Messages may be exchanged between the NFC reader and the NFC chip. The device may communicate with a payment service system to process the transaction by sending data retrieved from the NFC tag. The payment service system may process the data and facilitate a transfer of funds from a user account associated with the received token and the user account associated with the POS device. The POS device may be configured to select whether to the use the payment application or NFC tag to determine payment processing information based on for, example, the availability of the NFC tag, a preference of the user, merchant, or payment service, network availability, and other similar factors.

In particular embodiments, the NFC tag may use different formats. As an example and not by way of limitation, the NFC tag may be encoded using the NFC Data Exchange Format (NDEF) or be a custom applet. The custom applet may be software stored in the NFC chip embedded in a payment card (e.g., a smart card). When an NFC tag with a custom applet is interacting with an NFC reader, the NFC reader may select the custom applet using an application identifier of the custom applet. The NFC reader may send a series of commands to be executed by the custom applet. The custom applet may support functions associated with a payment card, such as credit, debit, and check-balance functions (e.g., through processing through a POS device). The custom applet may support additional context-based application as described herein. In particular embodiments, the custom applet may only work with POS devices or other devices that are associated with a payment service system. Interaction with the custom applet may requires specialized software to be executing on the device (e.g., a POS device or mobile device) using the NFC reader to communication with the NFC chip embedded in the payment card. This may increase the security of the payment card, by preventing non-authorized devices from accessing the custom applet on a payment card. In particular embodiments, the data of the NFC tag may be encrypted. As an example and not by way of limitation, the NFC tag may be statically encrypted or dynamically encrypted. Only certain devices, such as a POS device that is associated with a payment service, may be enabled to decrypt the data encoded on the NFC tag. For instance, the POS device may have software installed to decrypt the data. Additionally, smartphones with an application associated with a payment service may be enabled to decrypt the data. In particular embodiments, the data encoded on the NFC tags may be programmable to customize functionality or data.

A custom applet operating on an NFC tag of an NFC chip embedded in a payment card may also serve as a security key to be used with a wide variety of applications. Security keys may be a defense to a wide variety of security attacks, including phishing attacks. To function as a security key, the custom applet may be programmed in accordance with the U2F protocol published by the FIDO alliance. The payment card embedded with the NFC chip running a custom applet may conveniently serve as a physical second factor authentication method without requiring a user to carry additional equipment (such as a USB security key). Thus, an otherwise standard-appearing payment card (running a custom applet) could serve as a strong authenticator without. The custom U2F applet may use the existing NFC antenna and other circuitry built into the NFC chip that is otherwise used to facilitate contactless payments. In particular embodiments, a payment card without such a custom applet could be used with a software layer on an NFC reader (e.g., a mobile device) that translates between the NFC payment protocols and the U2F protocol. Such a programmed NFC reader could allow a payment service system to automatically authenticate merchants and card users when processing payments. Additionally, the payment service system may allow users to use an NFC-enabled payment card (whether operating with a custom applet or translating POS) as keys for other sites that support the U2F protocol. This may encompass pre-enrolling the security key custom applet/security key payment card to the user. Although NFC tags and NFC chips are discussed in relation to payment cards, other items comprising NFC tags and NFC chips are also contemplated to perform the various actions described herein.

In particular embodiments, a user may perform various account actions through interacting with a device using NFC. For example, the device may have the capability to use NFC directly (e.g., the device may have an integrated NFC chip). As another example, the device may be in communication with an NFC reader or other device with the capability to use NFC. The user may use a payment card to interact with a user account associated with a payment service. As an example and not by way of limitation, the payment card may be issued by or at the direction of the payment service to the user to be associated with the user's account. The payment card may comprise an NFC chip programmed with an NFC tag associated with the user's account. The user may perform an action, such as bringing an NFC tag into communication with an NFC reader by tapping the payment card in the area of its NFC chip to the NFC reader (e.g., POS device, a smartphone) to access a plurality of account actions. In particular embodiments, the plurality of account actions may, by way of example and not limitation, comprise one or more of activating a payment card, logging into a user account, associating a promotion to a user account, performing a transaction, requesting support, or delegating a user to access certain funds associated with the user account, among other account actions.

In particular embodiments, the amount of available account actions may correspond to the security level of the NFC tag and/or custom applet. That is, whether the data of the NFC tag is not encrypted, statically encrypted, or dynamically encrypted may determine the nature and the amount of account actions available to a user. As an example and not by way of limitation, high security actions, such as authorizing a transaction, may require the NFC tag (e.g., token), the NDEF message included in the NFC tag, or individual data records of the NDEF message to be encrypted. In particular embodiments, the available account actions may be determined based on the state of the device with the NFC reader. As an example and not by way of limitation, if a user's smartphone is in an inactive state and the user taps his payment card to his device (e.g., tapping the NFC chip to an NFC reader), then only account actions, such as contacting a customer support associated with the payment card may be enabled. As another example, if a user's smartphone is unlocked and the smartphone is executing a payment application associated with the payment service, then additional account actions, such as authorizing a transaction, may be enabled. By determining the amount of account actions available based on a state of the device, the security of the device is improved by ensuring that only the user has access to certain functions, such as delegating a user to access certain funds associated with the user's account. Additionally, security is further improved by enabling account actions, such as authorizing a transaction, when the device is unlocked to prevent someone from performing an account action, such as performing a transaction, without further user authorization.

In particular embodiments, the user may perform a card activation through an action initiated by NFC. As an example and not by way of limitation, the user may tap an NFC chip of a payment card to an NFC reader part of a device to perform an activation. The device may have a payment application installed that is associated with a payment service. The user may be logged into his or her user account of a payment service. In particular embodiments, upon receiving a token from the payment card through NFC, the device may send the token to a payment service system. The payment service system may determine whether the token is associated with a payment card that is activated. Additionally, the payment service system may determine whether the token is associated with a payment card that is associated with the payment service or another entity. In particular embodiments, upon detecting the payment card associated with the token is not activated, the payment service system may determine whether the token and/or payment card is associated with the user account of the user on the device. The token may comprise data indicating a payment card number and a user account that is assigned to the token. The payment service system may perform a lookup on a database of the payment service system to determine whether the token is associated with the user account that is associated with the device and/or the instance of the payment application executing on the device. If the payment service system determines that the token is not a match, the payment service system may indicate an error to the user. In particular embodiments, the payment service system may alert the user with whom the token is associated in the event fraud is detected. In particular embodiments, users may indicate their payment cards have been lost or stolen, which may trigger a monitoring procedure by the payment service system. If the payment service system determines that the token is a match to the user account, then the payment service system may activate the card to be used in transactions. In particular embodiments, tapping the payment card to a device as described herein may mean bringing the NFC chip of the payment card into communication with an NFC reader of the device by touching the NFC chip of the payment card or a portion of the payment card comprising the NFC chip to an NFC reader of the device or holding the NFC chip of the payment card near the NFC reader of the device. In particular embodiments, in response to detecting an NFC session (e.g., through receiving a token by a user tapping a payment card to a device), the device may generate a user interface to be displayed to a user. For instance, if the token is associated with a payment card that is not activated, the user interface that is displayed may comprise the options of activating the payment card or communicating with support (e.g., customer support). These options may be generated as activatable elements within the user interface for the user to select. The generation of the activatable elements within the user interface may improve user navigation through the user interface of an application, in turn increasing the efficiency of the device providing the user interface. For instance, a payment application may have several layers a user must navigate in order to activate a new card associated with a user account. By generating the activatable elements to be displayed to the user in a user interface, the user does not have to click through several layers of an application's user interface in order to get to a specific interface. Processing is also improved by reducing the processing associated with the selection and subsequent generation of the various layers of an application.

In particular embodiments, if the payment card is already activated, the user may use the payment card to log into his or her user account associated with a payment service. Upon reaching a login or identifying verification interface, the interface may alternatively indicate an option for the user to tap his or her payment card associated with the payment service to log into his or her user account associated with the payment service. In particular embodiments, the user interface may also indicate a location to tap the payment card. As an example and not by way of limitation, if the device was a smartphone, the user interface may indicate a location on the device of where to tap the payment card, such as by generating a circle element on the user interface with an indication to tap a payment card in that location. In particular embodiments, the device may determine the specifications of the device in order to identify the location of where to tap the payment card. As an example and not by way of limitation, one smartphone may have an NFC reader at the top of the device, whereas another smartphone may have the NFC reader located at the bottom of the device. In particular embodiments, the payment service system may have the specifications of smartphones stored in a database and may send the information to a device upon request, where the device may generate the user interface based on the received information. The identification and subsequent display of a location of where to tap a payment card to a device reduces a user's time spent looking for the location of where to tap the payment card and improves the system generally by improving the strength of communication connections between the NFC chip embedded in the payment card and the device. By quickly identifying and showing a user where to tap a payment card, the user does not need to guess where the NFC reader of the device is located. This may be especially helpful if the user is unfamiliar with the device or interacts with multiple devices each day.

In particular embodiments, the user may activate a promotion associated with the user account through an action initiated by NFC. In particular embodiments, when a device receives a token (via NFC) the device may collect context data associated with receiving the token. As an example and not by way of limitation, the device may identify instructions stored by the NFC chip (e.g., in a programmable NFC tag), where the instructions may include directions for a payment application or payment service system. As another example and not by way of limitation, the device may determine a geographic location associated with receiving the token, a date and time associated with receiving the token, or other context data. The device may send the context data (along with the token) to the payment service system with a request to perform an account action or the payment service system may request the context data from the device after initially receiving the token. In particular embodiments, the payment service system may identify various promotions that may be applied to the user account based on the context data. As an example and not by way of limitation, there may be a promotion to activate if the token is received around a certain time every week (e.g., a promotional context). As another example and not by way of limitation, the payment service system may determine one or more third-party entities nearby the geographic location of the user upon receiving the token. These third-party entities may be merchants located nearby and associated with the payment service system. The payment service system may identify one or more promotions corresponding to these nearby third-party entities and present the promotions for the user to select. In particular embodiments, the payment service system may generate recommendations indicative of which promotions to activate. The recommended promotions may be identified based on context data. Transaction history data of the user may be used to identify previous merchants that the user may have shopped at to identify recommended promotions. As an example and not by way of limitation, if the user frequently purchases Italian food, the payment service system may identify an Italian restaurant as a recommended promotion to activate if the user is nearby the Italian restaurant. The payment service system may also recommend promotions for merchants that the user does not frequently visit (e.g., to encourage the user to try a new merchant). The payment service system may select from a list of available promotions to recommend the user to activate. The payment service system may display the recommendations in such a way to differentiate the recommended promotions from other promotions. The payment service system may indicate the recommended promotions, such as by adding a border or icon to the recommended promotions. The payment service system may also only present the recommended promotions and hide the other promotions that are available. In particular embodiments, the user may be presented all applicable promotions based on the context when the token is received. These promotions may be presented in user interface as activatable elements for the user to select. The user may select one or more promotions to activate corresponding to his or her user account. The promotions may comprise a discount corresponding to the respective third-party entity, an offer, or the like to be applied to the user's account.

In particular embodiments, the user may perform a transaction through an action initiated by NFC. In particular embodiments, when a device receives a token (via NFC) the device may send the token to the payment service system. If the payment service system determines that the token corresponds to an activated payment card that is not associated with the user account of the device, then the payment service system may determine the received token is a request to perform an action involving a user account associated with the received token. As an example, the action involving the user account associated with the received token may be initiating a transaction involving the user account or a delegation function involving the user account. In particular embodiments, when the payment service system determines that the token is associated with a payment card that does not correspond to the user account of the device, the payment service system may send instructions to the device to generate a user interface requesting selection of an account action to perform. As an example and not by way of limitation, the user interface may comprise interactive elements that direct a user to conduct a transaction with another user (e.g., the user associated with the payment card) or direct a user to delegate another user to have access to certain funds associated with the user account of the user of the device. In particular embodiments, the tapping of a payment card not associated with the user account of a device may automatically bring up a user interface for performing an action with another user, such as conducting a transaction or delegating a user. In particular embodiments, the payment service system may determine one or more recommended actions based on instructions stored in the NFC tag (e.g., data) stored on the NFC chip embedded in the payment card and a context associated with the token. The context may comprise who the token is received from, a relationship between the users (e.g., user account associated with token and user account of the device owner), a geographic location, a date and time, transaction history, and the like. As an example and not by way of limitation, if the user account associated with the token is associated with a charity user account, then a recommended action may be to conduct a transaction with the charity by transferring funds to the charity user account. As another example and not way of limitation, if the token is associated with user account that the user has previous transactions with, then a recommended action may be to conduct another transaction. In particular embodiments, the user of the device may conduct a transaction with the user account associated with the payment card. The device may determine that a received token is not associated with a user account of the device and send a request to conduct a transaction with the user account associated with the received token to the payment service system. In particular embodiments, the payment service system may send instructions to the device to generate a user interface to display a transaction window where the user may select to pay or request money from a user account associated with the received token. In particular embodiments, the payment service system may send instructions to the device to generate a user interface to display a delegation window where the user may delegate a user to have access to funds associated with the user account of the device. As an example and not by way of limitation, the user associated with the device may delegate the user associated with the received token to be able to spend $20 with parameters specified by the user associated with the device. The user may determine the parameters for his or her delegate. In particular embodiments, the parameters may comprise one or more of a time interval the funds may be used within (e.g., within 4 hours), an amount that the user has available (e.g., a $30 limit), a geographic location the user is allowed to spend the funds at (e.g., only at the mall), a particular entity with whom the user may spend the funds (e.g., a website), and the like. When the delegate initiates a transaction using the payment card, the payment service may verify that the parameters are satisfied and approve the transaction using funds from an account associated with the user associated with the device.

In particular embodiments, the user may authorize a transaction through interaction with NFC. In particular embodiments, the payment service system may determine that a transaction is a high amount transaction that exceeds a threshold set by the user or by the payment service system. In response to determining that a transaction amount exceeds the threshold, the payment service system may request the user to authorize the transaction. In particular embodiments, the payment service system may request the user to tag the payment card associated with the user's account to the device to authorize the transaction. Thus, the use of the payment card in combination with a user's device may act as a form of additional identity verification and transaction authorization. As an example and not by way of limitation, if a first user (e.g., a sender) is logged into his user account on his device and the device receives a token (via NFC) from a payment card of a second user (e.g., a recipient such as a merchant), the first user may conduct a transaction with the second user. If the payment service system detects the transaction exceeds the threshold amount set by the user (e.g., $50), then the payment service system may request the first user (sender) to tap his payment card associated with his user account to his device in order to authorize the transaction. In particular embodiments, if there are multiple payment cards associated with the user account, the payment service system may request the user to tap the payment card associated with the user account from which the funds will be transferred by the transaction. In particular embodiments, the payment service system may request the user to use a biometric identification to authorize the transaction. As an example and not by way of limitation, the payment service system may request the user to input his or her fingerprint.

In particular embodiments, the user may customize account actions that are available based on received tokens. As an example and not by way of limitation, the user may request that if the user's device receives another token associated with a particular user account, then the user's device automatically generates a user interface to conduct a transaction with the user account associated with the token. In particular embodiments, the user may request that if the user's device receives another token associated with a different user account, then the device may generate a user interface with available account actions for the user to select. These and other user requests may be reflected in stored instructions for a payment application or payment service system stored in the NFC tag of an NFC chip embedded in the payment card. In particular embodiments, if the context of the device receiving the token includes a threshold number of nearby stores, then the user may request they be presented promotions corresponding to the nearby stores in response to the device receiving the token. In particular embodiments, the payment service system may analyze the transaction history of the user to recommend promotions. As an example and not by way of limitation, the payment service system may identify frequently visited merchants by the user, merchants the user has not visited yet, and the like in order to determine recommended promotions.

Particular described herein relate to methods of generating new interactions with a user account through reception of a token by a computing device via wireless data exchange protocols. Although this disclosure describes embodiments based around NFC data exchange protocols, it should be understood that the embodiment described herein may be applicable to other wireless data protocols, preferably short-range and security-focused protocols. Systems employing the embodiments described herein may provide specific account actions to a user based on context of receiving a token to improve a user's experience and the functioning of a payment application to quickly navigate through an application. The application may have different functions that the user may perform. A user performing an action, such as tapping a payment card to the user's device, may expedite the process of navigating through multiple screens within the application to a particular user interface associated with an account action (e.g., activate payment card or add merchant incentive to payment card). Expediting the process may cause the application executing on the device to perform more efficiently and may generally reduce the computing resources (e.g., computational cost and power consumption) needed by the computing device. Additionally, security of the payment system is improved by requiring a user to tap the programmable NFC-enabled payment card associated with the user account to authorize certain transactions, acting as an additional form of identification for the computing device. Particular embodiments described herein cause improvements in security of the data in NFC tags and data records stored on NFC chips of payment cards that may be achieved through the use of encryption of the data in storage and while the data is being communicated. Particular embodiments within cause other improvements in security of the data by allowing only devices that have requisite software associated with a payment service to be able to decrypt the data on the payment cards associated with the payment service. For example, only an application associated with, or approved of by, the payment service may be able to communicate with a custom applet or NFC tag storing data on the payment card. This may reduce the opportunities for data to be stolen and decrypted through NFC.

The embodiments disclosed herein are only examples, and the scope of this disclosure is not limited to them. Particular embodiments may include all, some, or none of the components, elements, features, functions, operations, or steps of the embodiments disclosed above. Embodiments disclosed in the attached claims directed to a method, a storage medium, a system and a computer program product, wherein any feature mentioned in one claim category, e.g., method, may be claimed in another claim category, e.g., system, as well. The dependencies or references back in the attached claims are chosen for formal reasons only. However, any subject matter resulting from a deliberate reference back to any previous claims (in particular multiple dependencies) may be claimed as well, so that any combination of claims and the features thereof are disclosed and may be claimed regardless of the dependencies chosen in the attached claims. The subject matter which may be claimed comprises not only the combination of features as set out in the attached claims but also any other combination of features in the claims, wherein each feature mentioned in the claims may be combined with any other feature or combination of other features in the claims. Furthermore, any of the embodiments and features described or depicted herein may be claimed in a separate claim and/or in any combination with any embodiment or feature described or depicted herein or with any of the features of the attached claims.

FIG. 1 illustrates an example payment service system network environment 100. A user 104 or "customer 104" may conduct transactions with a merchant 102 for items 106 offered by the merchant 102. The user 104 may also conduct transactions with a second user 154, possibly for items 106 offered by the user 154. The user 104 may use a user device 103, the merchant 102 may use a point-of-sale (POS) device 105, and the user 154 may use a user device 152. FIG. 1 also illustrates a payment service system 108 (also referred to as "payment service"), coupled to the user devices 103 and 152 and merchant POS device 105 via a network 110-1, to authorize payment instruments of user 104. User 104 may engage in transactions with merchant 102 to obtain items 106. User 104 may provide, payment instruments to merchant 102. Valid payment instruments may include cash, credit, check, or other suitable payment instruments along with requests for items or services offered by merchant 102 or user 154.

User 104 may use an NFC-enabled payment card 112 according to embodiments described herein. The NFC-enabled payment card 112 may be printed with payment card information or other account information associated with the user 104. The NFC-enabled payment card may have embedded within it in an NFC chip 113. In particular embodiments, the NFC chip 113 may be programmed by the payment service system 108 before being issued to the user 104. The NFC chip 113 may be programmed with multiple applets 160 and 165. The applets 160 and 165 may be used for a variety of purposes. For example, a first applet 160 may be a payment applet for use with standard POS devices 105 supporting NFC payments (e.g., through the EMV smart payments cards standards). A second applet 165 also programmed to the NFC chip 113 may be an applet provided by the payment service system 108 to enabled context-based actions by a payment application 107 executing on a mobile device 103 of the user 104 as described herein. Although FIG. 1 illustrates two applets 160 and 165 programmed to the NFC chip 113 embedded in the NFC-enabled payment card 112, this disclosure anticipates that several applets may be programmed to an NFC chip 113. Additional applets may include, as described above a security applet that complies with the U2F standard for use with user authentication, additional payment applets similar to applet 160 that include payment information associated with different payment cards of the user (e.g., one for a credit card and one for a debit card), membership or rewards cards (e.g., affiliated with a merchant 102), applets associated with different users who may use the NFC-enabled payment card 113, etc. In particular embodiments, the applets programmed to the NFC chip 113 may be customized by a user 104 or for a user 104 by the payment service system 108.

Merchant 102 may utilize POS device 105 for accepting payment from customer 104. POS device 105 may comprise any sort of mobile or non-mobile devices that include instances of a merchant application that executes on the devices. The merchant application may provide POS functionality to POS device 105 to enable merchant 102 (e.g., owners, employees, etc.) to accept payments from customers 104. In some types of businesses, POS device 105 may correspond to a store or other place of business of the merchant, and thus, may be a fixed location that typically does not change on a day-to-day basis. In other types of businesses, however, the location of POS device 105 may change from time to time, such as in the case that a merchant operates a food truck, is a street vendor, is a cab driver, etc., or has an otherwise mobile business, e.g., in the case of a merchant who sells items at buyer's homes, places of business, and so forth. In particular embodiments, POS device 105 may include NFC components that allow the POS device 105 to send and receive data through NFC. POS device 105 may be in communication with another device capable of sending and receiving data through NFC (e.g., an NFC reader).

User 154 may use mobile device 152 for accepting payment from customer 104. Mobile device 152 may be executing an instance of an application 153 associated with the payment service 108. The instance of the payment application 153 may provide wallet or even POS functionality to the user device 152 to enable user 154 to accept payments from other users 104. In particular embodiments, mobile device 152 may include NFC components that allow the mobile device 152 to send and receive data through NFC. Mobile device 152 may be in communication with another device capable of sending and receiving data through NFC (e.g., an NFC reader).

As used herein, a merchant may include any business engaged in the offering of goods or services for acquisition by customers. Actions attributed to a merchant may include actions performed by owners, employees, or other agents of the merchant, and thus no distinction is made herein unless specifically discussed. In addition, as used herein, a customer may include any entity that acquires goods or services from a merchant, such as by purchasing, renting, leasing, borrowing, licensing, or the like. Hereinafter, goods and/or services offered by merchants may be referred to as items, e.g., item 106. Thus, a merchant and a customer may interact with each other to conduct a transaction in which the customer acquires item 106 from merchant 102, and in return, customer 104 provides payment to merchant 102.

As used herein, a transaction may include a financial transaction for the acquisition of item(s) that is conducted between customer 104 and merchant 102. For example, when paying for a transaction, customer 104 may provide the amount that is due to the merchant using cash or other payment instrument (e.g., a debit card, a credit card, a stored-value or gift card, a check, through an electronic payment application 107 on device 103 carried by the customer, NFC-enabled payment card 112 or the like). The merchant may interact with POS device 105 to process the transactions, such as by inputting (e.g., manually, via a magnetic card reader, NFC reader, or an RFID reader, etc.) identifiers associated with the payment instrument. For example, a payment instrument of the customer may include a card having one or more magnetic strips for providing card and customer information when swiped in a card reader. In other examples, other types of payment instruments may be used, such as smart cards having a built-in memory chip that is read by the device when the card is inserted into the reader, such as chips that comply with an EMV standard, i.e., EMV smart payment cards. In other examples, other types of payment instruments include cards or computing devices that communicate via radio frequencies such as a radio frequency identification tags, and near field communication devices, etc. As appropriate, transaction may also include the transfer of funds from a first user 104 (e.g., a sender) to a second user 152 (e.g., a recipient) for items 106, services, or without a corresponding item at issue. For example, a user 104 may send a user 152 money as a gift through the instance of the payment application 107 executing on the mobile device 103 of the user 104.

During a transaction, POS device 105 (or mobile device 152 with an appropriate instance of the payment application 153) may determine transaction information describing the transaction, such as the identifier of the payment instrument, an amount of payment received from the user 104, the item(s) acquired by the user 104, a time, place and date of the transaction, a payment network 140 associated with the payment instrument, an issuing bank of the payment instrument, a name or user account of the user 104, contact information of the user 104, type of the currency, and so forth. POS device 105 (or mobile device 152) may send the transaction information to payment service system 108 over network 110-1, either substantially contemporaneously with the conducting of the transaction (in the case of online transactions) or later when POS device 105 (or mobile device 152) is in the online mode (as in the case of offline transactions).

In an offline transaction, POS device 105 or the payment application 153 may store one or more characteristics associated with the transaction (i.e., the transaction information), such as a cost of the transaction, a time of day at which the transaction occurred, a day of the week at which the transaction occurred, a location at which the transaction took place, an item that the user 104 obtained, identity and/or contact information of the user 104, and a payment instrument used in the transaction. After conducting an offline transaction with user 104, POS device 105 may provide the stored information (or some subset of it) to the payment service system 108 over the network 110-1. The network 110-1 may represent any one or more wired or wireless networks, such as a Wi-Fi network, a cellular network, or the like. In an online transaction, POS device 105 or mobile device 152 may send this information to payment service system 108 over network 110-1 substantially contemporaneously with the transaction with the user 104.

After merchant 102 or user 154 receives the payment information from customer 104, they may send respective authorization requests, along with information regarding the respective transactions, to payment service system 108, as illustrated at 114. Payment service system 108 may include payment processing service 126, merchant profiles 130, customer profiles 132, and other support information, such as a token association structure 134. Here, the merchant profiles 130 may comprise information about one or more merchants using the payment service system 108. The customer profiles 132 may comprise information about one or more customers using the payment service system 108. Each merchant or customer may otherwise be called a user of the payment service system 108. A particular user may be a merchant, a customer, or either depending on the use case. As described herein, the token associations structure 134 may store information associating tokens and requested actions with user accounts.

The payment processing service 126 may receive the information regarding a transaction from POS device 105 of merchant 102 or the instance of the payment application 153 executing on the mobile device 152 and attempt to authorize the payment instrument used to conduct the transaction. Payment processing service 126 may then send an indication of whether the payment instrument has been approved or declined back to the requesting device, as illustrated at 116.

When a user and a merchant enter into an electronic payment transaction, the transaction may be processed by electronically transferring funds from a financial account associated with the user to a financial account associated with the merchant or other user. As such, the payment processing service 126 may communicate with one or more computing devices of a payment card network 140 (or "card payment network") over network(s) 110-2 to conduct financial transactions electronically. Payment processing service 126 may also communicate with one or more computing devices of one or more banks, processing/acquiring services, or the like over the network 110-2. For example, payment processing service 126 may communicate with an acquiring bank, and/or an issuing bank, and/or a bank maintaining customer accounts for electronic payments. Payment processing service 126 may also communicate with, or access customer and merchant accounts maintained by payment service system 108.

An acquiring bank may be a registered member of a card association and may be part of a card payment network 140. An issuing bank may issue credit cards to buyers and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the customer may use a debit card instead of a credit card, in which case, the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

In transactions involving cryptocurrency, payment service system 108 may communicate over network(s) with one or more cryptocurrency networks. Cryptocurrency networks are associated with a network of parties that cryptographically verify and validate transactions and record transactions on copies of a distributed ledger commonly called the blockchain. Once a transaction has been validated, a cryptocurrency network may approve the transaction by writing the transaction to the blockchain. The time for such processes to complete may be impractically long for many applications.

Networks 110-1 and 110-2 may represent any one or more wired or wireless networks, such as a Wi-Fi network, a cellular network, a wide area network, a local area network, or the like. For the purposes of illustration, networks 110-1 and 110-2 are shown as separate networks. In particular embodiments, networks 110-1 and 110-2 may be the same network, subnets of the same network, one or more separate networks, or other suitable arrangement.

While FIG. 1 illustrates merchants 102 and users 154 sending the transaction data directly to the payment service system 108 as part of the request to authorize the payment instrument, in some instances other entities (e.g., banks associated with the merchants or with customer payment instruments) may provide transaction data, such as part of a batched, periodic process.

While customer profiles 132 may store indications of user preferences, merchant profiles 130 may store information associated with respective profiles of the merchants 102. For instance, the merchant profiles 130 may indicate a class of items offered by respective merchants (e.g., coffee items, collectibles, apparel, etc.), a type of business of the merchant (e.g., restaurant, coffee shop, retail store, etc.), a geographical location of the merchant, and the like.

In some instances, a computing device associated with the merchant (e.g., POS device 105, servers of the merchant, etc.) or user 154 may determine when the customer visits physical premises or a digital presence of the merchant or is in the vicinity of the user 154. For instance, the device 103 of the customer 104 may include an application 107 (e.g., an application provided by payment service system 108) that communicates with POS device 105 of merchant 102 or mobile device of the user 154 via short-range and near-field communication methods. Therefore, when the customer visits the physical premises of merchant 102, for example, POS device 105 may detect the presence of customer device 103. The POS device may accordingly determine that the customer is present. In another example, POS device 105, mobile device 152, and user device 103 may share locations (e.g., GPS coordinates) to a common service for determining when the devices are located within a threshold proximity of one another, and for mediating a transaction between customer device 103 and POS device 105 or mobile device 152.

In another example, customer 104 may utilize customer device 103 to "check in" at a merchant location, and POS device 105 may receive an indication of this check in. When the customer visits a digital presence of merchant 102 (e.g., a website, etc.), customer 104 may log in or otherwise provide information (e.g., a cookie on the device 103) from which the merchant determines that the customer is at the merchant. Of course, while a few examples are listed, it is to be appreciated that the merchant and/or payment service system 108 may determine when the customer is present at the merchant in any other number of ways. In each instance, after payment service system 108 receives an indication that customer 104 is located at merchant 102, the payment service system 108 may determine whether to send one or more previously expressed item preferences of the customer to the merchant.

In addition, customer 104 may desire to receive an instance of a payments application 107, such as a mobile wallet application, from the payment service system 108. FIG. 1 illustrates, at 118, that the customer 104 may send payment-application requests to payment service system 108. In response, at 120, payment service system 108 may provide instances of the application 107 back to customer device 103. In addition, payment service system 108 may map an identification of the instance of the application 107 to the customer profile.

In some embodiments, one or more of the applications 153 and 107 may be point-of-sale applications. In some embodiments, one or more of the applications 153 and 157 may be mobile wallet applications. In some embodiments, one or more of the applications 153 and 157 may be applications provided by a third party capable of accessing at least one payment account. The present technology contemplates that currency or assets may be sent from any party of any character (merchant, user, bank, etc.) to any other party of any character using the innovations described herein.

The payment service system 108, in coordination with the POS system 105, payment applications 153 and 107 allows, for a more expansive array of payment options, transactions that are completed more quickly and accurately by reducing the communication and processing times needed for computing systems of various parties to authorize and process the transactions and simplifies the interactions and interfaces that a user must engage with in order to prepare and request the transactions. Taken together, these improvements amount to an overall improvement over previous payment processing systems and related devices. The payment service system therefore includes significant technical advantages and improvements over previous devices.

Figure 2:
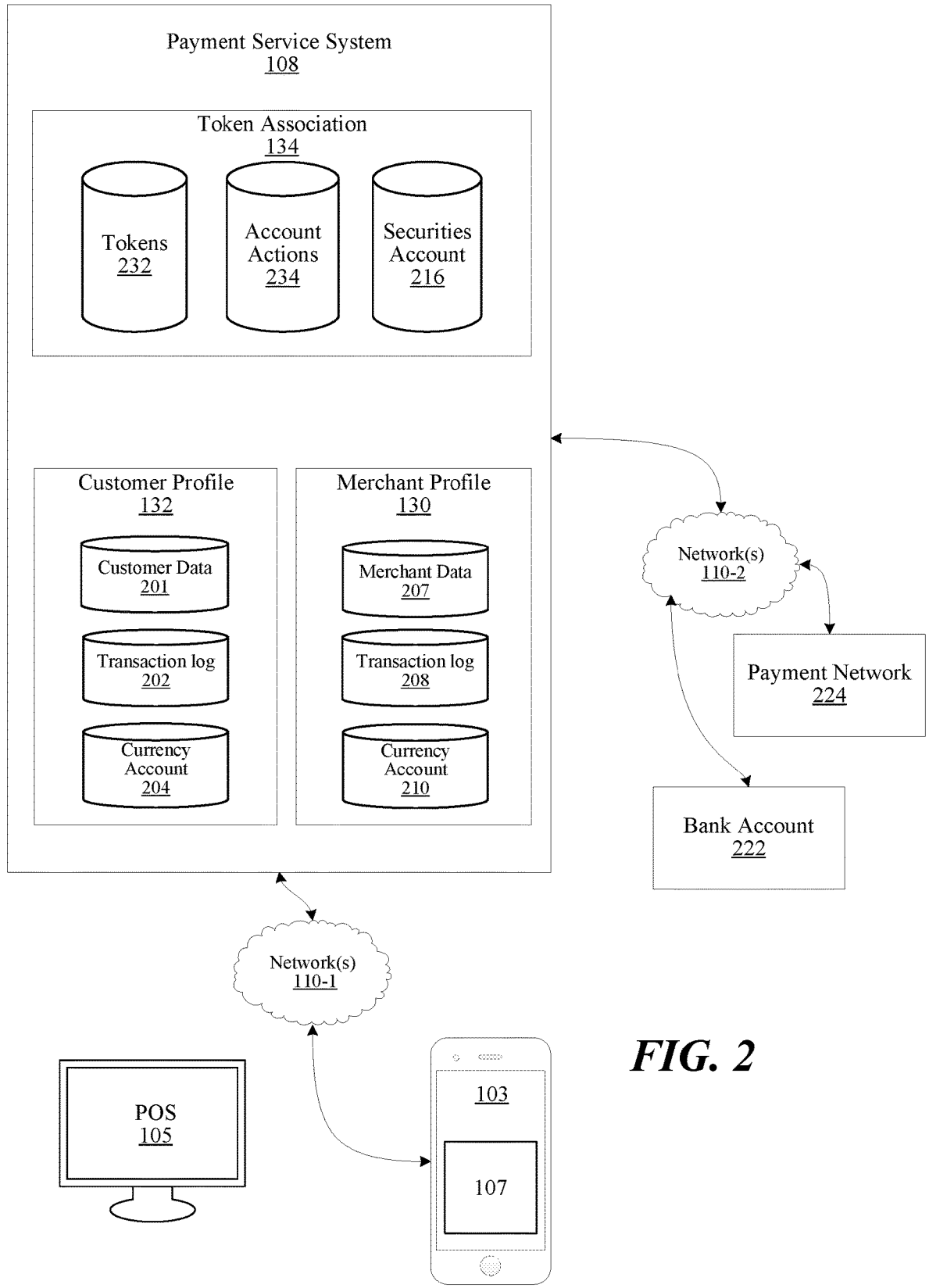
FIG. 2 illustrates an example system architecture for a payment service system.

FIG. 2 illustrates an example system architecture for a payment service system 108 embodying aspects of the inventions described herein. In particular embodiments, the payment service system 108 may store customer profile 132 for each of a plurality of customers. Customer profile 132 may include customer data 201 that may include customer-identifying information (name, contact information, demographical data, etc.), a transaction log 202 including records of past transactions involving payment service system 108 by customer 104, information regarding linked accounts (credit card information, bank account information, securities accounts, etc.), information regarding services utilized by customer profile 132 (e.g., an instance of a mobile wallet application). The customer data 201 may further comprise information associated with one or more social or peer-to-peer contacts of a user (e.g., friends, family members, online network connections). The information may comprise at least part of the profile information of such contacts.

The customer profile 132 may also include a record 204 for any accounts managed by payment service system 108 on behalf of customer 104. It will be appreciated that customers having accounts managed by the payment service system 108 is an aspect of the technology that enables technical advantages of increased processing speed and improved security. For example, the customer profile 132 may include a currency account 204. The currency account 204 may include information regarding one or more separate accounts of the user that each include currency owned by the customer. The currency account may include information regarding any valid payment method managed by the payment service system 132 on behalf of the customer, including, but not limited to, fiat currency, cryptocurrency, securities, etc. The currency accounts 204 may include a logical division of currency held by the payment service system 108 that is allocated for the customer's use.

An account may be funded by transferring currency in the form associated with the account from an external account (e.g., transferring a quantity of cash to payment service system 108), or by purchasing currency in the form associated with the account from the payment service system 108 using currency in a different form (e.g., buying a value of a security asset from payment service system 108 using a value of fiat currency), or by conducting a transaction with another user (customer or merchant) of the payment service system 108 wherein the account receives incoming currency. An account may be funded by purchasing security assets via the payment service system 108. When a customer requests to purchase security assets from the payment service system 108, the payment service system 108 may debit a balance stored in the currency account 204 of a certain type and credit a balance stored in a security account. The customer profile 132 may also comprise preference settings as to a preferred asset for payments (e.g., a preference to use a particular currency to pay for day-to-day transactions).

Similarly, as introduced with respect to FIG. 1 payment service system 108 may store merchant profiles 130. The merchant profiles 130 may comprise merchant data 207, transaction log 208, and currency account 210. The merchant data 207 may comprise one or more preference settings associated with the merchant 102, such as a type of currency or asset that the merchant prefer to receive as payment. The information stored in the merchant profile 130 may be made accessible and managed by a merchant 102 through a POS device 105 or other suitable devices associated with the merchant 102. Operations, including maintenance and management operations, described with respect to the customer profile 132 and information included therein (e.g., the customer data 201, transaction log 202, currency account 204) are as much applicable to the merchant profile 130 and the information included therein (e.g., the merchant data 207, transaction log 208, currency account 210).

When two users (e.g., users 150 and 154) engage in a transaction that involves a transfer of assets, such a transaction may be reflected in the accounts associated with each customer's profile 132. As an example and not by way of limitation, a first user 104 may transfer a quantity of currency (e.g., fiat currency, cryptocurrency, security assets, etc.) to a second user 154. The payment service system 108 may accordingly debit the currency account 204 of the first user 150 and credit the currency account 204 of the second user 154.

Additionally, customer 104 may also have one or more external payment cards registered with payment service system 108. The external payment cards may be associated with external bank accounts 222. The external payment card accounts may not be managed by payment service system 108. Instead, an appropriate external payment network 224 may process transactions conducted with payment cards.

Additionally, customer 104 may also have one or more internal payment cards registered with payment service system 108. Internal payment cards may be linked to some or all accounts associated with customer profile 132. In some embodiments, options with respect to internal payment cards may be adjusted and managed using a payment application 107 installed on the customer device 103. For example, when customer profile 132 includes multiple payment accounts (e.g., cryptocurrency and fiat currency), application 107 may set one of those accounts to be the default account for debits or credits when using an internal payment card.

Customer 104 may access and monitor customer profile 132 including payment cards registered with payment service system 108 and currency account 204 through the application 107 installed on the customer device 103. The application 107 may be a customer facing application provided by payment service system 108, or that is configured to access customer profile 132 through use of one or more APIs provided by payment service system 108. In some embodiments, application 107 on the customer device 103 may provide digital wallet functionality including storing payment methods and permitting electronic payments by customer device 103 at the instruction of application 107.

In particular embodiments, the payment service system 108 may maintain a token association data structure 134. The payment service system 108 may use said structure 134 to provide a token association service as described herein. The token association structure 134 may require generation and storage of a plurality of tokens 232. Tokens may be uniquely-assigned random or pseudo-random character strings generated by the payment service system 108. The tokens may be assigned to a payment card number. The payment service system 108 may assign payment card numbers and their corresponding tokens to a user account, such as a customer profile 132 after a request from the user 104 for a payment card. The token or identifying information therefore may be encoded into an NFC tag of the NFC chip embedded in the payment card upon generation of the payment card. In particular embodiments the payment service system 108 may dynamically reprogram the NFC tags of the payment cards through various devices 103, 105 that the payment card would interface. To identify the token corresponding to a payment card, the data associated with the NFC tag of the payment card may be decoded and possibly decrypted by suitably configured devices. The payment service system 108 may provide users the option to re-map tokens to different payment cards.

Token database 232 may store links to customer profiles 132 and/or customer accounts that are associated with a token. A token may be considered claimed when it associated with an account or an account action. An unclaimed token may be available to be claimed by a user with a valid account who interacts with the claimed token.

Although this disclosure describes the token association service being maintained operated by the payment service system 108, this disclosure contemplates that token association may be operated by a separate system associated with the payment service system 108 controlled by the provider of the payment service or by a third-party. Combining the token association service with the payment service may increase speed and reliability of access to tokens and associated payment cards. Maintaining the token association service as a separate service from the payment service (e.g., accessible via one or more APIs) may provide for greater security to the payment service system.

FIGS. 3A-3C illustrate example user interfaces for a process 300 of performing an account action associated with a received token. In particular embodiments, the user interfaces are directed to illustrating a process 300 of activating a payment card using an example mobile application 107 associated with a payment service system 108, the mobile application 107 executing on a user device 103. The mobile application 107 may provide functionalities for a user to access and manage his or her user account. As illustrated by FIG. 3A, a user may tap his payment card 302 to an NFC reader of the user device 103 while the user device is executing a mobile application 107 with a user interface 304. The user interface 304 may represent a home screen of the mobile application 107. The user interface 304 may comprise a representation of an electronic payment card 306 associated with the payment card 302 associated with the user account logged into the mobile application 107. As an example and not by way of limitation, the payment service system 108 may assign the electronic payment card 306 to the user account initially and send the payment card 302 to the user to use for transactions and performing account actions based on NFC communication. In particular embodiments, the user may access available account actions after tapping the payment card 302 to the user device 103 (e.g., by tapping the NFC chip of the payment card 302 to the NFC reader of the user device 103).

The user interface 308 shown in FIG. 3B illustrates the result of the user tapping the payment card 302 to the user device 103. The mobile application 107 may receive a token associated with the payment card 302 through NFC. For example, the user device 103 may comprise an NFC reader. The NFC reader of the user device 103 may send the token to the mobile application 107 or otherwise make the token available to the user device 103. The mobile application 107 may decode and/or decrypt the token as necessary and identify the payment card and/or user account associated with the token. For example, the mobile application 107 may send the token or a token identifier and other contextual information to the payment service system 108 which may return information about the payment card 302. The returned information may indicate that the payment card associated with the token is associated with the user currently using the mobile application 107. The returned information may further indicate that the payment card is not yet activated for use (e.g., it has recently been provided by the payment service 108 to the user). The mobile application 107 may provide user interface 308 for display to the user. The user interface 308 may comprise an "Activate Card" button 310 directing the user to an interface for activating the payment card 302 associated with the user account and a "Payment Card Support" button 312 directing the user to an interface for interacting with support for the payment card 302. As shown in FIG. 3B, the user may select the "Activate Card" button 310 through a user input 314. After the user selects the "Activate Card" button 310, the mobile application 107 may send a message to the payment service system 108 notifying the payment service system 108 that the user has elected to activate the payment card 302. The payment service system 108 may then permit transactions involving the payment card 302 to be processed.

The user interface 316 shown in FIG. 3C illustrates the result of the user selecting the "Activate Card" button 310 through a user input 314. The user interface 316 may be an overlay on top of the user interface 308. In other embodiments, the user interface 316 may open a separate screen different from user interface 308. The user interface 316 may comprise an activation message 318 notifying the user of successful activation after determining the activation has been successful.

FIGS. 4A-4B illustrate example user interfaces for a process 400 of identifying to a user the correct location to tap a payment card 402 on a mobile device 103 to ensure NFC will work. In particular embodiments, the user interfaces are directed to a process 400 of identifying a scan area using an example mobile application 107 associated with a payment service system, the mobile application 107 executing on a user device 103. The mobile application 107 may provide functionalities for a user to access and manage his or her user account, e.g., through the embodiment discussed throughout. Users may use different devices 103 to execute a mobile application 107 and, as such, these devices may have different specifications. That is, various devices users may use to execute the mobile application 107 may have NFC readers in different locations as compared to other devices. As illustrated by FIG. 4A, a user may tap his payment card 402 by touching the NFC chip 404 to a location of a NFC reader of the first user device 103a. The user may be logged into the mobile application 107 on a first user device 103a. The user interface 406 may represent a home screen of the mobile application 107. The user interface 406 may comprise an electronic payment card 408 of the payment card 402 associated with the user account logged into the mobile application 107. In particular embodiments, the user interface 406 may display a scan area 410 expressly indicating to the user where to tap the NFC chip 404 of the payment card 402. In some embodiments, the scan area 410 may include an express command, such as "Tap Card" indicating the appropriate location to hold the payment card for optimum NFC. In particular embodiments, the scan area 410 may be activated by a button (not shown) in the user interface 406. The scan area 410 may appear within the user interface 406 after a predetermined time period. As an example and not by way of limitation, after a period of 5 seconds of inactivity within the user interface 406, the mobile application 107 may generate and display the scan area 410. In particular embodiments, mobile application 107 may store the appropriate location of a user interface at which to display the scan area 410 for a variety of devices in a database. The mobile application 107 may detect the model of the mobile device 103a on which it is executing. When displaying the scan area 410, the mobile application 107 may query the database to identify the appropriate location. In particular embodiments, mobile application 107 may send a request to the payment service system 108 identify the appropriate location to display the scan area 410. The payment service system 108 may store the appropriate locations in a database (e.g., based on the specifications of devices that may execute the mobile application 107).

As illustrated by FIG. 4B, a user may tap his payment card 402 by touching the NFC chip 404 to an NFC reader of the second user device 103b within a user interface 412. The user may be logged into the mobile application 107 on a second user device 103b that is different from the first user device 103a. The user interface 412 may represent a home screen of the mobile application 107. The user interface 412 may comprise an electronic payment card 408 of the payment card 402 associated with the user account logged into the mobile application 107. In particular embodiments, in lieu of an express scan area (e.g., scan area 410) indicating where to tap the NFC chip 404 of the payment card 402, the mobile application 107 may position the representation of the electronic payment card 408 at the location where the user is to tap the payment card 402 for NFC. As described above, the appropriate location may be determined by the mobile application 107 (e.g., by querying a database stored locally on the mobile device 103b based on the model of the mobile device 103b) or may be determined by the payment service system 108 based on a request by the mobile application 107.

Figures 5A, 5B, 5C:
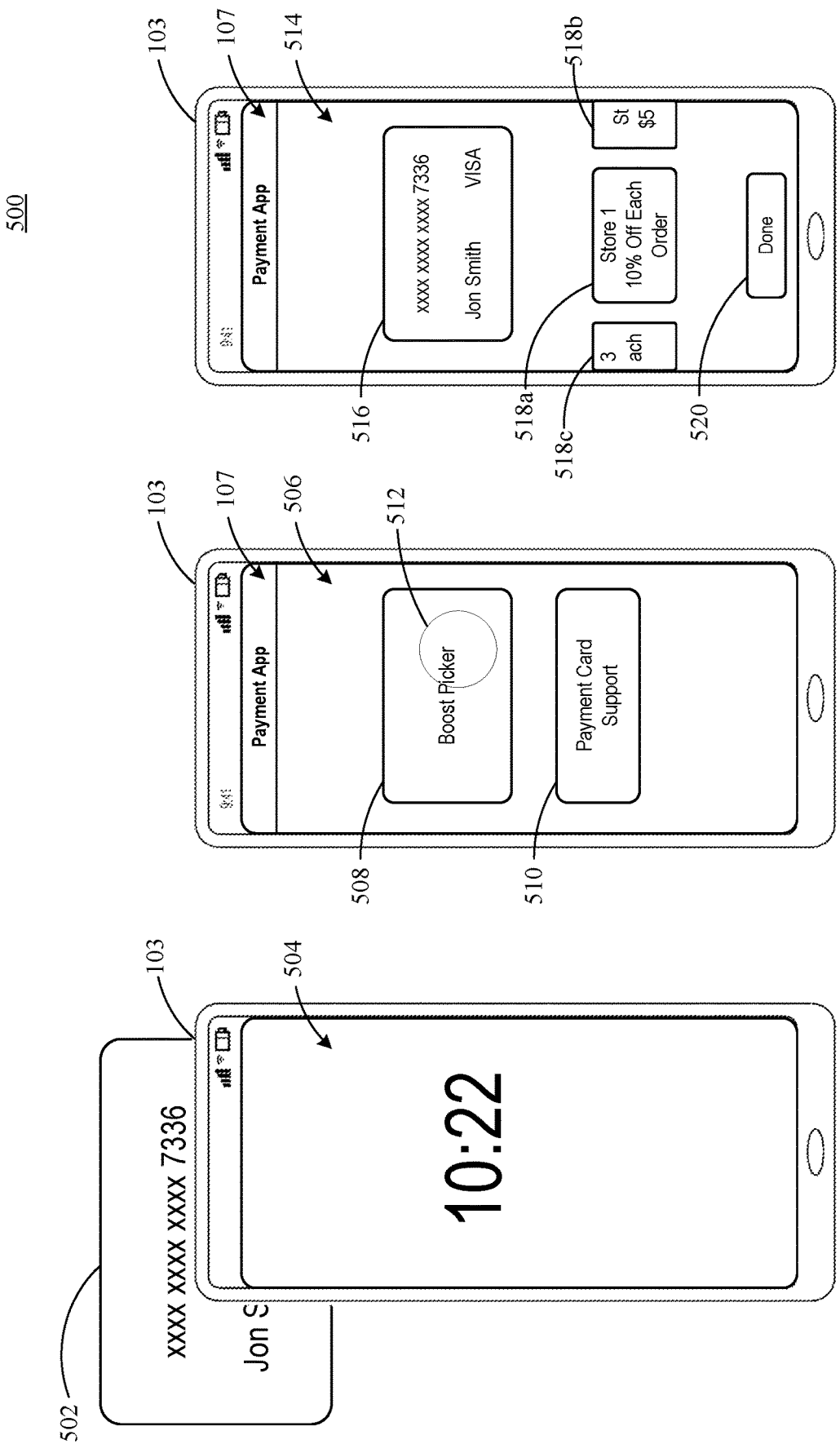
FIGS. 5A-5C illustrate example user interfaces relating to performing an account action associated with a received token.

FIGS. 5A-5C illustrate example user interfaces for a process 500 of performing an account action based on a token received via NFC. In particular embodiments, the user interfaces are directed to a process 500 of activating a promotion using an example mobile application 107 associated with a payment service system, the mobile application 107 executing on a user device 103. The mobile application 107 may provide functionalities for a user to access and manage his or her user account. As illustrated by FIG. 5A, a user may tap his payment card 502 to an NFC reader of the user device 103 within a user interface 504. The user interface 504 may represent a lock screen associated with the user device 103. The user interface 504 may represent a screen the user device 103 enters after a period of inactivity. As shown in FIG. 5A, a user may tap his payment card 502 to the user device while the user device 103 is otherwise inactive to perform an account action. A mobile application 107 (that may be running in the background) may receive a token associated with the payment card 502 through NFC. For example, the user device 103 may comprise an NFC reader. The NFC reader of the user device 103 may send the token to the mobile application 107 or otherwise make the token available. The mobile application 107 may decode and/or decrypt the token as necessary and identify the payment card and/or user account associated with the token. For example, the mobile application 107 may send the token or a token identifier, stored instructions, and other contextual information to the payment service system 108 which may return information about the payment card. The contextual information that is sent to the payment service system 108 may include one or more of a geographic location of the user device 103, a date and time associated with the received token, transaction history of the user account associated with the token, and the like. The returned information may indicate that the payment card associated with the token is associated with the user currently using the mobile application 107. The returned information may also include one or more generated recommended promotions to be stored on the user device 103 until the user requests recommended promotions.

The user interface 506 shown in FIG. 5B illustrates the result of the user tapping the payment card 502 to the user device 103. In particular embodiments, the user device 103 may present a log in screen to access the user device 103 (e.g., in the event the user device 103 is locked) before presenting the user interface 506. In particular embodiments, the user tapping the payment card 502 may be used to authenticate the user's identity and unlock the device 103 and the mobile application 107. The user interface 506 may comprise a "Boost Picker" button 508 directing the user to an interface for activating one or more available promotions to be associated with the user account and a "Payment Card Support" button 510 directing the user to an interface for interacting with support for the payment card 502 or the user's account. In particular embodiments, when the user selects the "Boost Picker" button 508, the user device 103 may access the stored recommended promotions received from the payment service system 108. In particular embodiments, the "Boost Picker" button 508 may be shown more prominently based on stored instructions and contextual information. As an example and not by way of limitation, if the user is in a shopping mall, the "Boost Picker" button 508 may be displayed in an emphasized manner to encourage the user to select the "Boost Picker" button 508. In particular embodiments, the "Boost Picker" button 508 may be customized based on the one or more available promotions. As an example and not by way of limitation, if there are 3 available promotions, the "Boost Picker" button 508 may include an indication showing that there are 3 available promotions to be associated with the user account. In particular embodiments, the selection of the "Boost Picker" button 508 may initiate a recommended promotion determination process to identify recommended promotions for the user based on the contextual information. As shown in FIG. 5B, the user may select the "Boost Picker" button 508 through a user input 512.

The user interface 514 shown in FIG. 5C illustrates the result of the user selecting the "Boost Picker" button 508 through a user input 512. In particular embodiments, the user interface 514 may be an overlay on top of the user interface 506. In other embodiments, the user interface 514 may open a separate screen of the mobile application 107 different from user interface 506. The user interface 514 may comprise a representation of an electronic payment card 516 associated with the payment card 502 associated with the user account logged into the mobile application 107. The user interface 514 may comprise a plurality of promotions 518a-518c each enabling the user to apply a promotion to the user account, and a "Done" button 520 directing the user to a home screen of the mobile application 107. When a user applies a promotion to their account, the promotion may remain active for any transactions meeting a set of specified criteria for applying the promotion. For example, a promotion may include a discount off of any purchases made at a specific store, or a specific location of a chain of stores.

Figure 6:
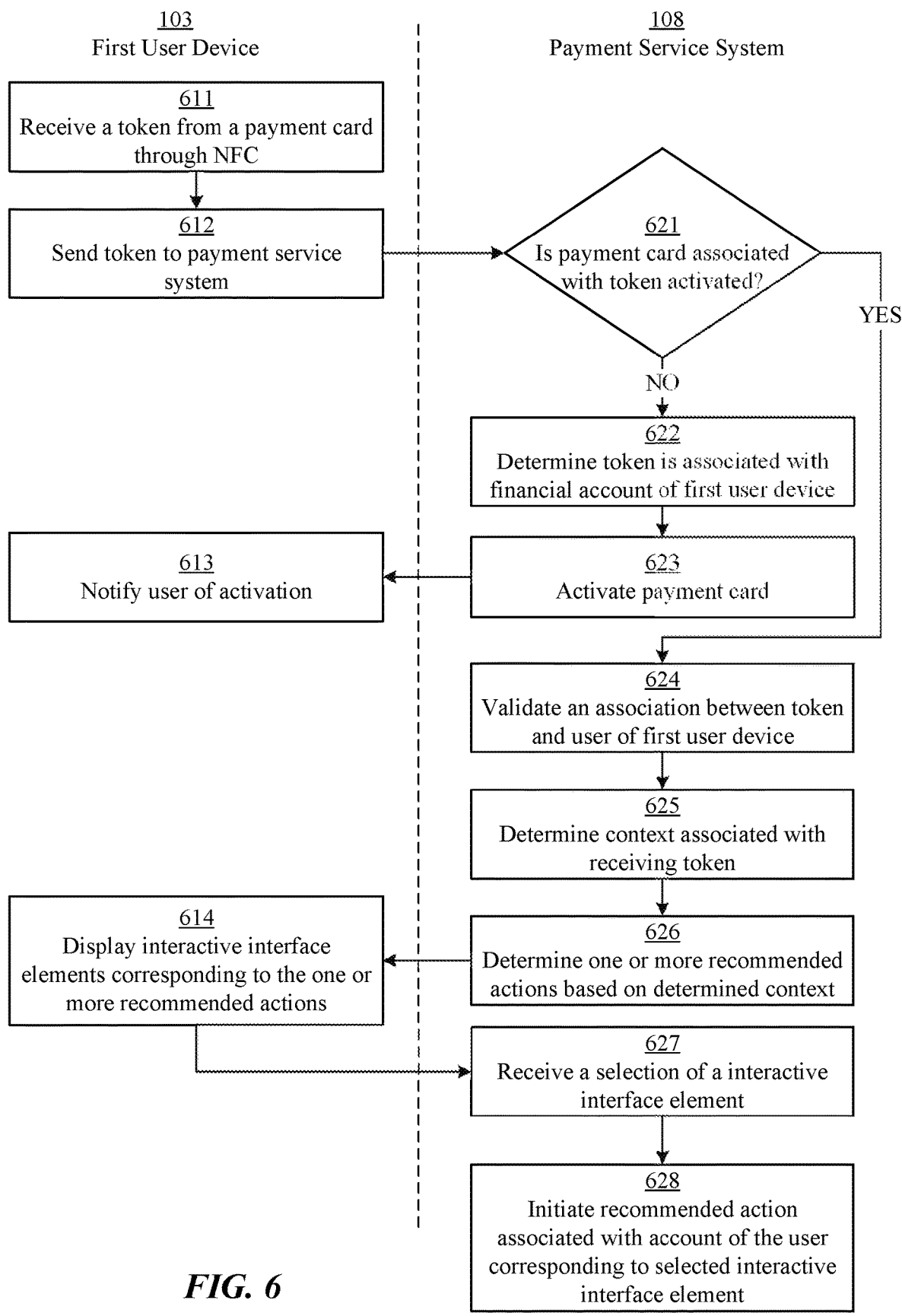
FIG. 6 illustrates an example method for initiating an account action based on receiving a token.

FIG. 6 illustrates the interactions between various actors, including a first user device 103 (e.g., user device 103) and a payment service system 108, in a process for initiating an account action in response to receiving a token via NFC. In particular embodiments, the process may include determining whether to perform an action involving a single user's account (e.g., activate a payment card or a promotion for the user account). In reviewing FIG. 6, the process generally advances as the blocks representing steps of the process proceed from the top of the figure downward so that, even if an arrow does not connect blocks, a first block (e.g., the block for step 611) above a second block (e.g., the block for step 622) will generally occur first in the process. Although FIG. 6 illustrates particular steps as being performed by particular devices, it will be understood that one or more illustrated steps may be performed by another device.

The process may begin at step 611, in which a first user device 103 may receive a token from a payment card through NFC. As described herein, in particular embodiments, a user may tap a payment card to an NFC reader of the first user device 103. The NFC reader may communicate with an NFC chip embedded in the payment card. In particular embodiments, the NFC reader may perform applet selection. In particular embodiments, the NFC reader may decrypt and/or decode the token as necessary. Decrypting and/or decoding the token may encompass extracting particular information from the token. For example, the first user device 103 may extract information sufficient to identify the user associated with the token, such as a unique payment proxy (also referred to as a "cashtag") that uniquely identifies the user. At step 612, the first user device 103 may send the token to the payment service system 108. In sending the token to the payment service system 108, first user device may access one or more APIs associated with the payment service system 108 to request additional information about the token. The request sent via the one or more APIs may include sending the token and any extracted information to the payment service system via the API request(s). For example, the first user device 103 may send the token to the payment service system 108 in the same form as it was received from the NFC chip embedded in the payment card. As another example, the first user device 103 may extract a user token from the token received from the NFC chip embedded in the payment card. The first user device 103 may send the user token to the payment service system 108. Whether the application executing on the first user device 103 is capable of decrypting/decoding the token received from the NFC chip embedded in the payment card may enable different technological improvements. For example, in a system confirmation that does not permit the application to decode the token (e.g., to determine a user token or unique payment proxy) the payment service system 108 is the only entity that has the necessary security information to decode the token. This may enhance security of the system, as only a single entity tightly controlled by the payment service can access information necessary to cause changes to a user's account. As another example, in a system configuration in which the application is capable of decrypting/decoding at least part of the information, the payment service may more efficiently process offline payment (e.g., where there is limited or no network connectivity) or process payments on a batch basis as opposed to real-time. Because the application executing on the first user device 103 can obtain certain information necessary to facilitate, as an example only, payments, the first user device 103 need not immediately communicate with the payment service system 103 to request and record payments and other account actions.

At step 621, the payment service system 108 may determine whether the payment card associated with the received token (whether it is sent as a payment card token or user token) is activated. That is, the payment service system 108 may access a database to determine whether the token is linked to a payment card that is activated. If the payment service system 108 determines that the payment card associated with the token is not activated, then the process may proceed to step 622 where the payment service system 108 may determine the token is associated with the financial account of the first user device 103. As an example and not by way of limitation, the payment service system 108 may access a database to determine a user account associated with the token. The user account may have been associated with a token in the database when the user requested a payment card for the user account (e.g., when the payment card is created for the user) by the payment service. The payment service system 108 may compare the user account associated with the instance of the payment application that sent the token and the user account associated with the token and determine that the token is associated with the user account that sent the token. However, if the payment service system 108 determines the token is not associated with the financial account of the first user device, the payment service system 108 may send a notification to the first user device 103 that the token does not match the user account or that an error occurred. In particular embodiments, the payment service system 108 may also determine the user account to which the token is registered and send a notification to that user as well as a measure of preventing fraud or identifying lost and stolen cards. As stated above, steps 621-622 may be performed by the first user device in particular embodiments. For example, the first user device 103 may comprise a database (updated regularly) that contains the information relevant to the performance of these steps. At step 623, the payment service system 108 may activate the payment card. After the payment service system 108 activates the payment card, the payment service system 108 may send a notification of the activation to the first user device 103. At step 613, the first user device 103 may notify the user of the activation of the payment card.

If, at step 621, the payment service system 108 determines that the payment card associated with the token is activated, the process may proceed to step 624, where the payment service system 108 may validate an association between the token and the user of the first user device (e.g., the user account associated with the mobile application executing on the first user device 103). As an example and not by way of limitation, the payment service system 108 may compare the user account associated with the first user device 103 (sent or otherwise identified to the payment service system by the first user device 108 prior to step 624) and the user account associated with the token (e.g., retrieved from a database storing associations between payment card tokens and user accounts). The association is validated when the two user accounts match. At step 625, the payment service system 108 may determine a context associated with receiving the token. The payment service system 108 may have received context information from the first user device 103 associated with the first user device receiving through token through NFC with the payment card. In particular embodiments, the payment service system 108 may receive the context information in addition to the token from the first user device 103 in step 612. In particular embodiments, the payment service system 108 may request context data and receive the context data from the first user device 103 on-demand, that is, when the payment service system 108 determines that it will require analysis of context information. The context information may refer to a geographic location of the first user device 103 upon receiving the token, a date and time associated with receiving the token, information retrieved from the first user device 103 coinciding with receiving the token (e.g., information from an address book or calendar of the user stored on the first user device 103), additional security credentials such as biometric information, among other context data.

At step 626, the payment service system 108 may determine one or more recommended actions based on the context determined in step 625. The recommended actions may be determined from a set of actions identified to be relevant to the user based on the context information and information recorded by the payment service system 108 about the user and other users determined to be similar in some fashion to the user. As an example and not by way of limitation, the payment service system 108 may identify promotions the user may be interested in applying to his or her user account based on the determined context. The payment service system 108 may determine stores near the location of the first user device 103 that may have promotions available to apply to a user account, such as a 10% off transactions with a particular store. The payment service system 108 may determine one or more of the promotions to recommend to the user based on a transaction history of the user with the store. As another example, the payment service system 108 may suggest that the user perform an administrative function associated with a financial account linked to the token of the payment card. The payment service system 108 may determine that the user has had trouble completing a transaction (for example, due to mis-entering a personal identification number or password associated with the payment card). The payment service system 108 recommend that the user perform another form of authentication to the complete the transaction or may recommend that the user contact customer support associated with the financial account. The payment service system 108 may send the recommended actions to the first user device 103, and at step 614, the first user device 103 may display interactive interface elements corresponding to the one or more recommended actions. As an example and not by way of limitation, the first user device 103 may display buttons corresponding to promotions to activate and apply to the user account. The first user device 103 may display buttons that, when interacted with, will cause the mobile device to place a call with the appropriate customer support.

At step 627, the payment service system 108 may receive a selection of an interactive interface element from the first user device 103. At step 628, the payment service system 108 may initiate the recommendation action associated with the financial account of the user corresponding to the selected interactive interface element. As an example and not by way of limitation, the payment service system 108 may activate a promotion associated with a selected promotion to apply to the user's account. As stated previously, one or more steps of 624-628 may also be performed by the first user device 103. For example, in an offline scenario (e.g., where there is limited or no network connectivity between the first user device 103 and the payment service system 108, the first user device 103 may comprise a limited version of the databases and records necessary to enable the validation and decision-making steps shown above.

Figures 7C, 7D:
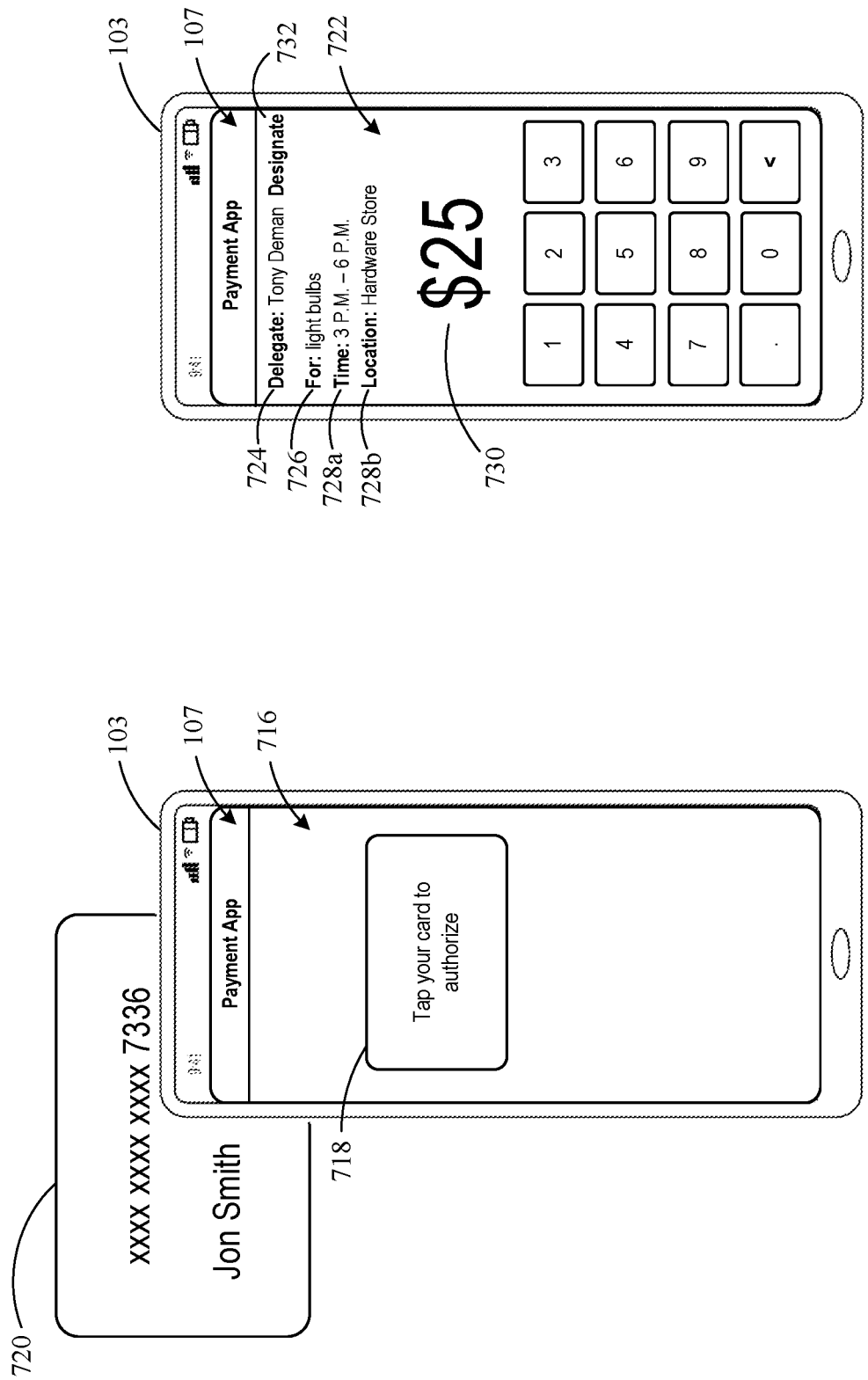

FIGS. 7A-7D illustrate example user interfaces for a process 700 of performing an account action based on a token received through NFC with a payment card. In particular embodiments, the user interfaces are directed to a process 700 of assigning a delegate for a user account using an example mobile application 107 associated with a payment service system, the mobile application 107 executing on a user device 103. The mobile application 107 may provide functionalities for a user to access and manage his or her user account. As illustrated by FIG. 7A, a user may tap his payment card 702 to an NFC reader of the user device 103 within a user interface 704, or otherwise bring the NFC chip of the payment card 702 within an effective distance of the NFC reader of the user device 103. The user interface 704 may represent a home screen associated with the mobile application 107. The user interface 704 may comprise a representation of an electronic payment card 706 that is associated with the user account of the user logged into the mobile application 107. In the illustrated example the electronic payment card 706 may be different than the payment card 702. That is, the payment card 702 is associated with a user different from the user logged into the mobile application 107. As shown in FIG. 7A, a user may tap the payment card 702 to the user device 103.

The user interface 708 shown in FIG. 7B illustrates the result of the user tapping the payment card 702 to the user device 103. The mobile application 107 may receive a token associated with the payment card 702 through NFC. For example, the user device 103 may comprise an NFC reader. The NFC reader of the user device 103 may send the token to the mobile application 107 or otherwise make the token available to the user device 103. The mobile application 107 may decode and/or decrypt the token as necessary and identify the payment card and/or user account associated with the token. For example, the mobile application 107 may send the token or a token identifier, stored instructions retrieved from the NFC tag, and other contextual information to the payment service system 108 which may return information about the payment card 702. The contextual information that is sent to the payment service system may include one or more of a geographic location of the user device 103, a date and time associated with the received token, transaction history of the user account associated with the token, and the like. The returned information may indicate that the payment card 702 associated with the token is associated with a user and a user account identifier. The user account identifier may identify a user account associated with the payment card 702. The mobile application 107 may provide user interface 708 for display to the user. The user interface 708 may comprise a "Designate delegate" button 710 directing the user to an interface to delegate a user to access funds associated with the user account of the user device 103 and a "Request or Pay" button 712 directing the user to an interface to perform a transaction between the user account of the user device 103 and the user account associated with the payment card 702. As shown in FIG. 7B, the user may select the "Designate delegate" button 710 through a user input 714.

The user interface 716 shown in FIG. 7C illustrates the result of the user selecting the "Designate delegate" button 710 through a user input 714. In particular embodiments, the mobile application 107 may send a request to designate a delegate to the payment service system 108. In particular embodiments, if the user selects the "Request or Pay" button 712, then the mobile application 107 may send a request to perform a transaction to the payment service system 108. In particular embodiments, in response to receiving the request to designate a delegate, the payment service system 108 may send instructions to the mobile application 107 to present a request to authorize the transaction. The user interface 716 may be an overlay on top of the user interface 708. In other embodiments, the user interface 716 may open a separate screen different from user interface 708. The user interface 716 may comprise a notification 718 requesting the user to authorize the transaction. Specifically, the notification 718 requests the user to tap the payment card associated with the user account logged into the mobile application 107 to the user device 103 in order to authorize the account action. In particular embodiments, user interface 716 may be shown whenever the action requested by the user involves transferring funds from a financial account of the user. In particular embodiments, user interface 716 may be shown in response to detection of an event requiring an additional verification, as set by the user or determined by the payment service system 108. Such an event may include the transfer or allocation of an amount of money above a threshold amount, a transaction occurring at unusual times, locations, or with unfamiliar mobile devices, a transaction being requested with a merchant suspected of being used for fraudulent transactions, a sign-in to a financial account of the user, etc. As shown in FIG. 7C, the user may tap his payment card 720 to the user device 103 to authorize the account action of delegating a user to have access to his funds.

The user interface 722 shown in FIG. 7D illustrates the result of the user tapping his payment card 720 to the user device 103 to authorize the account action of delegating a user to have access to his funds. In particular embodiments, the mobile application 107 may receive a token associated with the payment card 720 through NFC. The mobile application 107 may process the payment card 720 similarly to payment card 702. The mobile application 107 may send the token or a token identifier, stored instructions retrieved from the NFC tag, and other contextual information to the payment service system 108 which may return information about the payment card 720. The returned information may indicate that the payment card 720 associated with the token is associated with the user currently using the mobile application 107. The user interface 722 corresponds to an interface for designating a delegate. The user interface 722 may comprise a field 724 indicating the delegate (e.g., other user) to whom the user is providing access to funds associated with the user's account. In particular embodiments, the delegate field 724 may be automatically populated with the information corresponding to the payment card 702 of the delegate. For example, the information shown in the delegate field 724 may be determined from the token received from the NFC chip of the payment card 702. The information may be determined from information locally stored on the user device 103 (e.g., in a database storing account information of users with whom the user has previously interacted). The information may also be retrieved from the payment service system 108 after the mobile application 107 executing on the user device 103 sends the token to the payment service system 108. The payment service system 108 may identify the information to be included in user interface 722 from one or more databases of the payment service system 108 after the token is validated. In particular embodiments, the user may change the delegate and/or select a different delegate. The user interface 722 may comprise a description 726 of the use for which the funds have been delegated. The description 726 may restrict the types of items the delegate may use the funds to purchase. As an example and not by way of limitation, the transaction may be denied if the funds are used for items not listed in the description 726. Although an item is described in the description 726, the description 726 may broadly relate to a category of items that the funds are available for use to purchase. The user interface 722 may comprise a plurality of delegate parameters 728, such as a time period 728a of when the delegate is given access to spend the delegated funds and a location 728b of where the delegate is given access to spend delegated funds. That is, the delegate may be restricted in using the funds delegated to them based on time, geographic location, and other related parameters. The user interface 722 may comprise a delegated amount 730 that indicates an upper limit of funds available to the delegate from the user account. The user interface 722 may comprise a "Designate" button 732 that confirms delegation of the delegate amount 730 to the delegate with the delegate parameters 728 and description 726. In particular embodiments, if the user confirms the delegation of funds to the delegate through selecting the "Designate" button 732, then the payment service system 108 may send a notification to the user device of the delegate to notify them of having access to the delegate amount 730. In particular embodiments, the payment service system 108 may place a hold on the delegated amount of funds in the user's account to prevent the user spending of the funds. In particular embodiments, the payment service system 108 may transfer the appropriate funds to the account of the delegated user and prepare to automatically transfer any unused funds after the time of use has expired.

Figure 8:
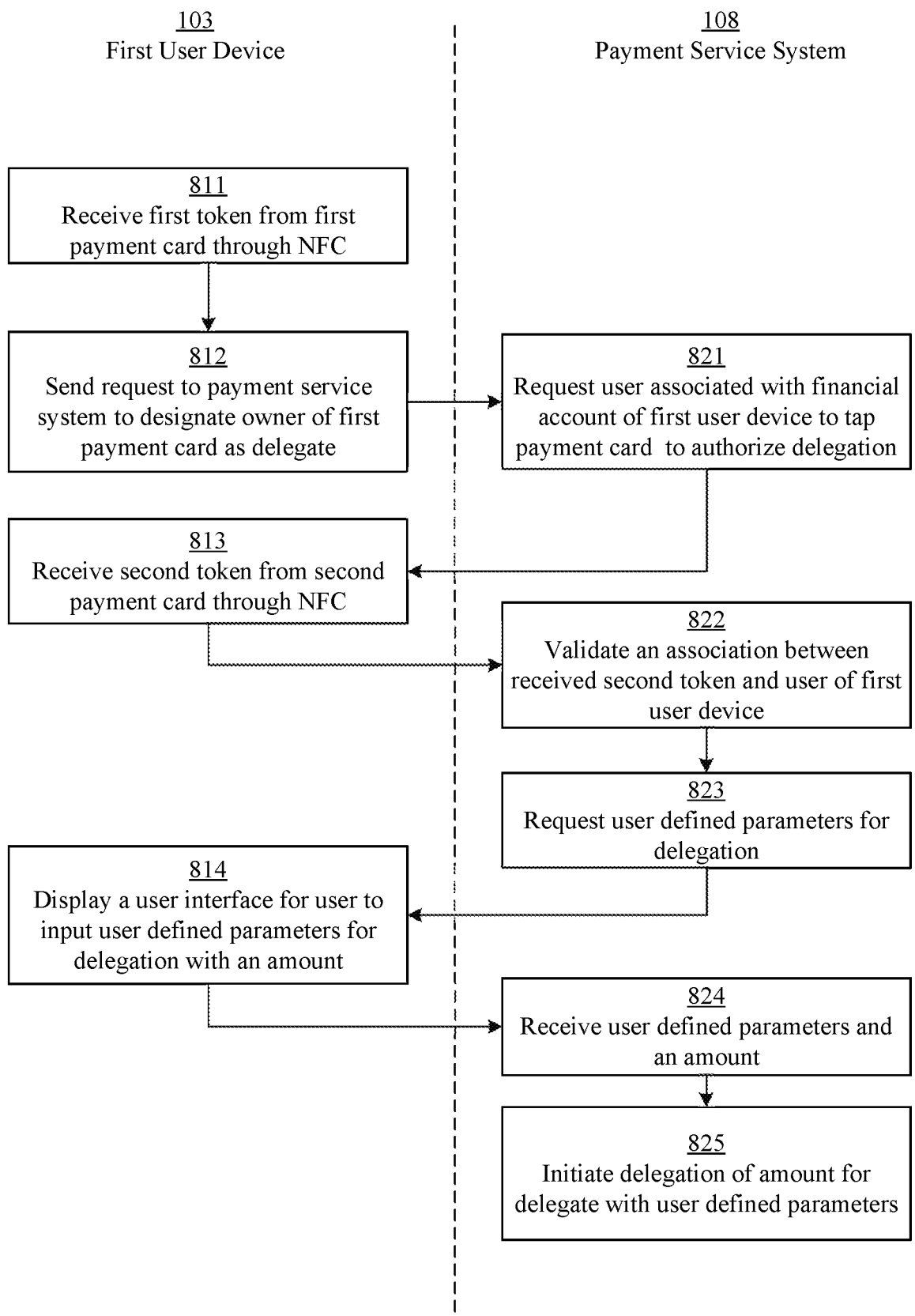
FIG. 8 illustrates an example method for initiating an account action based on receiving a token.

FIG. 8 illustrates the interactions between various actors, including a first user device 103 (e.g., user device 103) and a payment service system 108, in a process for initiating an account action in response to receiving a token via NFC. In particular embodiments, the process may include determining whether to perform an action involving a two user accounts (e.g., delegate access to funds associated with the user account). In reviewing FIG. 8, the process generally advances as the blocks representing steps of the process proceed from the top of the figure downward so that, even if an arrow does not connect blocks, a first block (e.g., the block for step 811) above a second block (e.g., the block for step 821) will generally occur first in the process. Although FIG. 8 illustrates particular steps as being performed by particular devices, it will be understood that one or more illustrated steps may be performed by another device.

The process may begin at step 811, in which a first user device 103 may receive a first token from a first payment card through NFC. As described herein, in particular embodiments, the user may tap a first payment card to an NFC reader of the first user device 103. The NFC reader may communicate with an NFC chip embedded in the first payment card. In particular embodiments, the NFC reader may perform applet selection. In particular embodiments, the NFC reader may decrypt and/or decode the token as necessary. As discussed previously with respect to FIG. 6, decrypting and/or decoding the token may encompass extracting particular information from the token. For example, the first user device 103 may extract information sufficient to identify the user associated with the token, such as a unique payment proxy (also referred to as a "cashtag") that uniquely identifies the user. At step 812, the first user device 103 may send the first token to the payment service system 108 with a request to the payment service system 108 to designate the owner of the first payment card as a delegate. The token may be sent through one or more APIs of the payment service system 108. In particular embodiments, depending on the information determined by the first user device 103 from the token received via communication with the NFC chip embedded in the payment card, the request may indicate the owner of the first payment card. In particular embodiments, the payment service system 108 may access a database to determine a user account associated with the token. At step 821, the payment service system 108 and/or first user device 108 may determine that additional verification of is required and may request the user (e.g., the delegator) associated with the financial account of the first user device 103 to tap his or her payment card to authorize the delegation. The payment service system 108 may send the request to the first user device 103 which presents the request to the user. In particular embodiments, the request may be presented as a notification. After receiving the request, at step 813, the first user device 103 may receive a second token from a second payment card through NFC. In particular embodiments, the user associated with the financial account of the first user device 103 may tap his or her payment card to the first user device 103. The first user device 103 may send the second token, or a send request via one or more APIs where the request includes the token as received via communication with the NFC chip embedded in the payment card or a user token with other information determined from the token, to the payment service system 108 after receiving the second token from the second payment card through NFC. After the payment service system 108 receives the second token, the payment service system 108 (or first user device 103) may validate an association between the received second token and the financial account of the first user device 103 (e.g., the financial account of the user, delegator, associated with the mobile application executing on the first user device 103. As an example and not by way of limitation, the payment service system 108 may compare the user account associated with the first user device 103 (sent or otherwise identified to the payment service system by the first user device 108 prior to step 822) and the user account associated with the second token (e.g., retrieved from a database storing associations between payment card tokens and user accounts). The association is validated when the two user accounts match. After validation, at step 823, the payment service system 108 may request user defined parameters for delegation. The request may be sent to the first user device 103. At step 814, the first user device 103 may display a user interface for the user (e.g., the delegator) to input user defined parameters for delegation with an amount. In particular embodiments, the user defined parameters may include a description of items purchased, a time period of when the delegate is given access to spend the delegated funds, and a location of where the delegate is given access to spend the delegated funds. The user may input the user defined parameters and then press a designate button to send the user defined parameters to the payment service system 108. At step 824, the payment service system 108 may receive the user defined parameters and an amount to be delegated. At step 825, payment service system 108 may initiate delegation of the amount for the delegate with the user defined parameters. The payment service system 108 may place a hold on the delegated amount of funds in the user's account to prevent the user spending of the funds. In particular embodiments, the payment service system 108 may transfer the appropriate funds to the account of the delegated user and prepare to automatically transfer any unused funds after the time of use has expired.

Figure 9B:
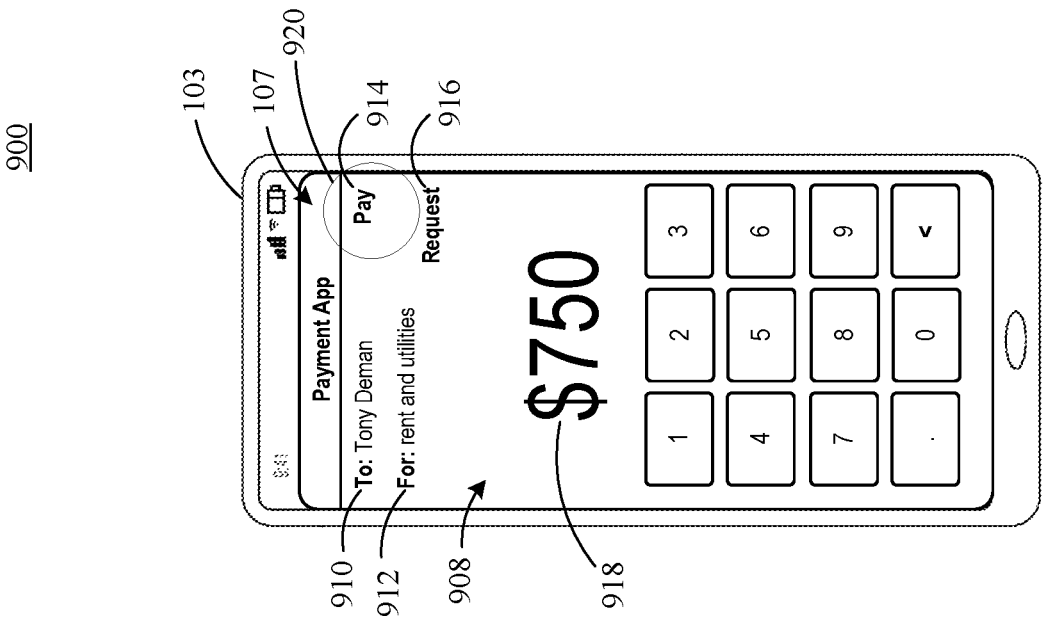
FIGS. 9A-9D illustrate example user interfaces relating to performing an account action associated with a received token.
Figure 9A:
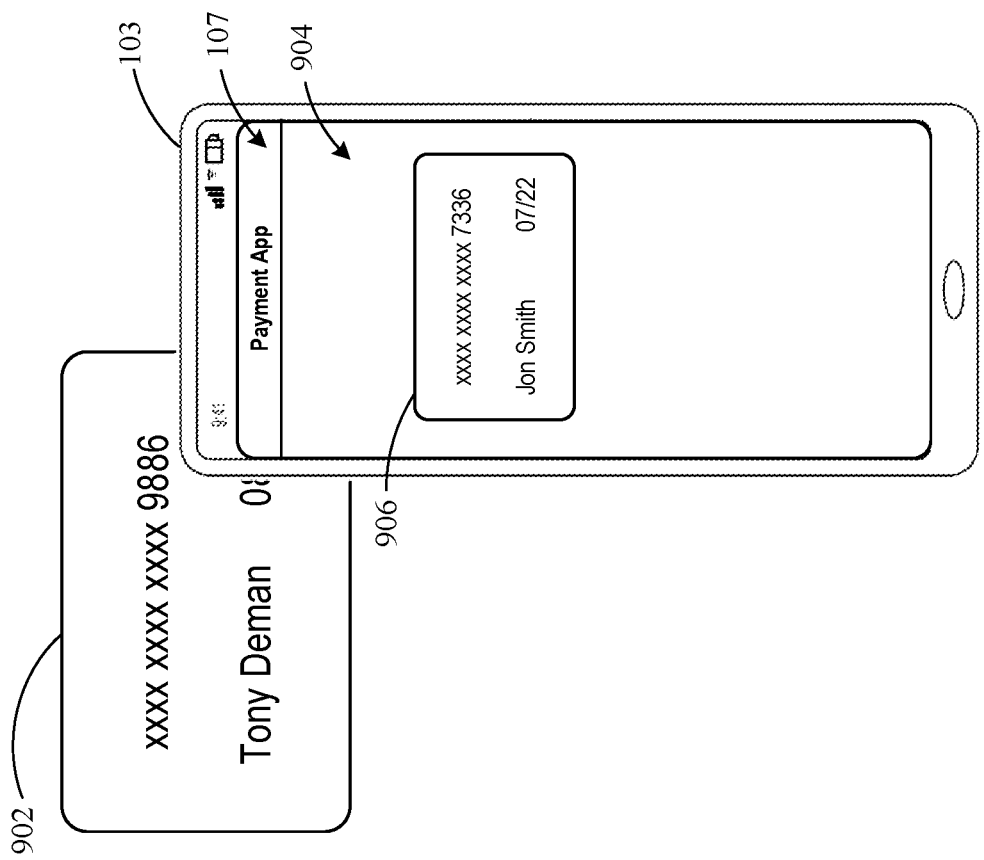

FIGS. 9A-9D illustrate example user interfaces for a process 900 of performing an account action based on a token received through NFC with a payment card. In particular embodiments, the user interfaces are directed to a process 900 of performing a transaction using an example mobile application 107 associated with a payment service system 108, the mobile application 107 executing on a user device 103. The mobile application 107 may provide functionalities for a user to access and manage his or her user account. As illustrated by FIG. 9A, a user (e.g., a recipient) may tap his payment card 902 to an NFC reader of the user device 103 within a user interface 904, or otherwise bring the NFC chip of the payment card 902 within an effective distance of the NFC reader of the user device 103. The user interface 904 may represent a home screen associated with the mobile application 107. The user interface 904 may comprise a representation of an electronic payment card 906 that is associated with the user account of the user logged into the mobile application 107. The user interface 904 may also comprise other ways of identifying the user account logged into the mobile application 107. In the illustrated example, the electronic payment card 906 (e.g., of the sender) may be different than the payment card 902 (e.g., of the recipient). That is, the payment card 902 is associated with a user different from the user logged into the mobile application 107. As shown in FIG. 9A, a user may tap the payment card 902 to the user device 103.

The user interface 908 shown in FIG. 9B illustrates the result of the user (e.g., recipient) tapping the payment card 902 to the user device 103. The mobile application 107 may receive a token associated with the payment card 902 through NFC. For example, the user device 103 may comprise an NFC reader. The NFC reader of the user device 103 may send the token to the mobile application 107 or otherwise make the token available to the user device 103. The mobile application 107 may decode and/or decrypt the token as necessary and identify the payment card and/or user account associated with the token. For example, the mobile application 107 may send the token or a token identifier, stored instructions retrieved from the NFC tag, and other contextual information to the payment service system 108 which may return information about the payment card 702. The contextual information that is sent to the payment service system may include one or more of a geographic location of the user device 103, a date and time associated with the received token, transaction history of the user account associated with the token, and the like. The returned information may indicate that the payment card 902 associated with the token is associated with a user and a user account identifier. The user account identifier may identify a user account associated with the payment card 902. The mobile application 107 may provide user interface 908 for display to the user (e.g., the sender). The user interface 908 may comprise a transaction interface 908 where the user of the user device 103 may enter details of the transaction. The user interface 908 may comprise a "To" line 910 indicating with who the transaction is being conducted, a description 912 indicating what the transaction is for, a "Pay" button 914 directing the user to an interface to perform a transaction to send the user in the "To" line 910 an amount, a "Request" button 916 directing the user to an interface to perform a transaction to request the user in the "To" line 910 an amount, and an amount 918 associated with the transaction. In particular embodiments, the "To" line 910 may be automatically populated based on the user associated with the payment card 902 (e.g., of the recipient). For example, the information shown in the "To" line 910 may be determined from the token received from the NFC chip of the payment card 902. The information may be determined from information locally stored on the user device 103 (e.g., in a database storing account information of users with whom the user has previously interacted). The information may also be retrieved from the payment service system 108 after the mobile application 107 executing on the user device 103 sends the token to the payment service system 108. The payment service system 108 may identify the information to be included in user interface 908 from one or more databases of the payment service system 108 after the token is validated. In particular embodiments, the user may also edit the "To" line 910 to another user. In particular embodiments, the user interface 908 may comprise a plurality of numeric buttons to enter the amount 918. The user interface 908 may be pre-populated with an amount recommended for the transaction. As shown in FIG. 9B, the user may select the "Pay" button 914 with a user input 920.

Figure 9D:
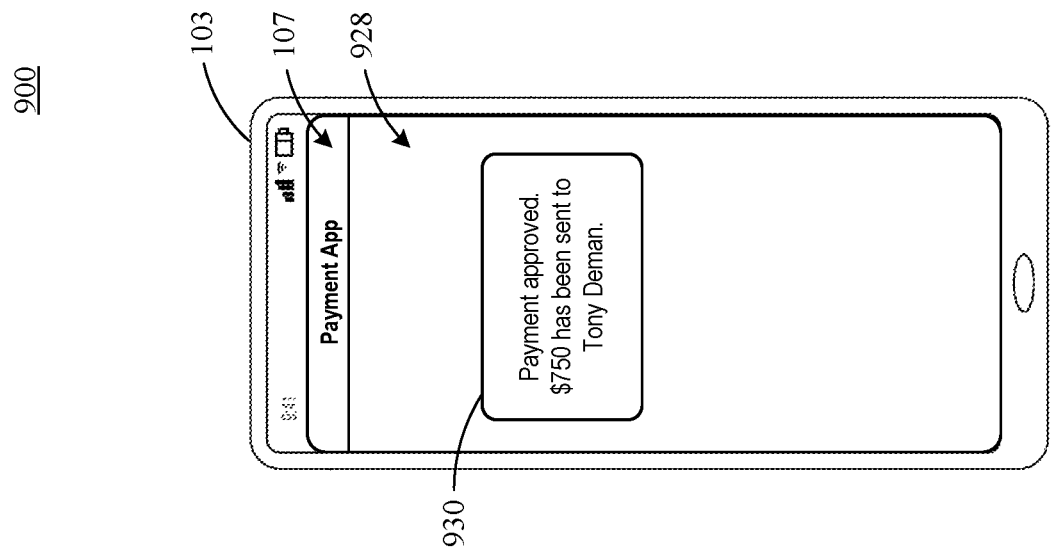
Figure 9C:
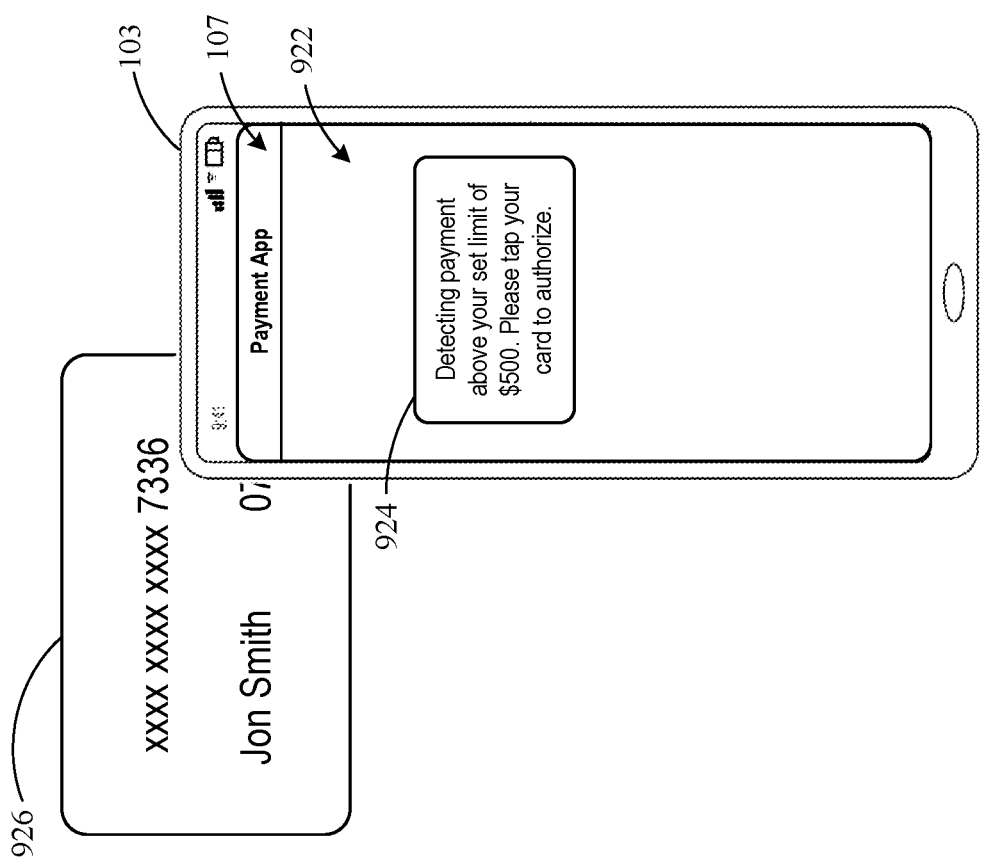

The user interface 922 shown in FIG. 9C illustrates the result of the user (e.g., sender) selecting the "Pay" button 914 with a user input 920. In particular embodiments, the user device 103 may send a request to the payment service system 108 to perform a transaction, where an amount of funds from the user account is to be transferred to the user account associated with the payment card 902. In particular embodiments, in response to detecting the user is attempting to transfer an amount greater than a threshold amount (that is set by the user or determined by the payment service system 108), the payment service system 108 may send a request to authorize the transaction. The user interface 922 may be an overlay on top of the user interface 908. In other embodiments, the user interface 922 may open a separate screen different from user interface 908. The user interface 922 may comprise a notification 924 notifying the user (e.g., sender) that additional authorization is required to process the transaction. For example, the notification 924 may be shown in response to the payment service system 108 or the mobile application 107 detecting a payment request exceeding a threshold amount set by the user. The notification 924 may request the user to tap his payment card 926 to the user device 103 in order to authorize the transaction. As shown in FIG. 9C, the user (e.g., sender) may tap his payment card 926 to the user device 103 to authorize the account action of performing a transaction to pay another user. The user device 103 may generate and send an indication of authorization to the payment service system 108.

The user interface 928 shown in FIG. 9D illustrates the result of the user performing a tap action with his payment card 926 (e.g., of the sender) to the user device 103. In particular embodiments, the mobile application 107 may receive a token associated with the payment card 926 through NFC. The mobile application 107 may process the payment card 926 similarly to payment card 902. The mobile application 107 may send the token or a token identifier and other contextual information to the payment service system 108 which may return information about the payment card 926. The returned information may indicate that the payment card 926 associated with the token is associated with the user currently using the mobile application 107. The user interface 928 may comprise a notification 930 that notifies the user the payment has been approved upon a successful determination that the user's payment card 926 was used to authorize the transaction. In particular embodiments, the payment service system 108 may facilitate the transfer of funds associated with the transaction after the successful determination that the user's payment card 926 was used to authorize the transaction.

Figure 10:
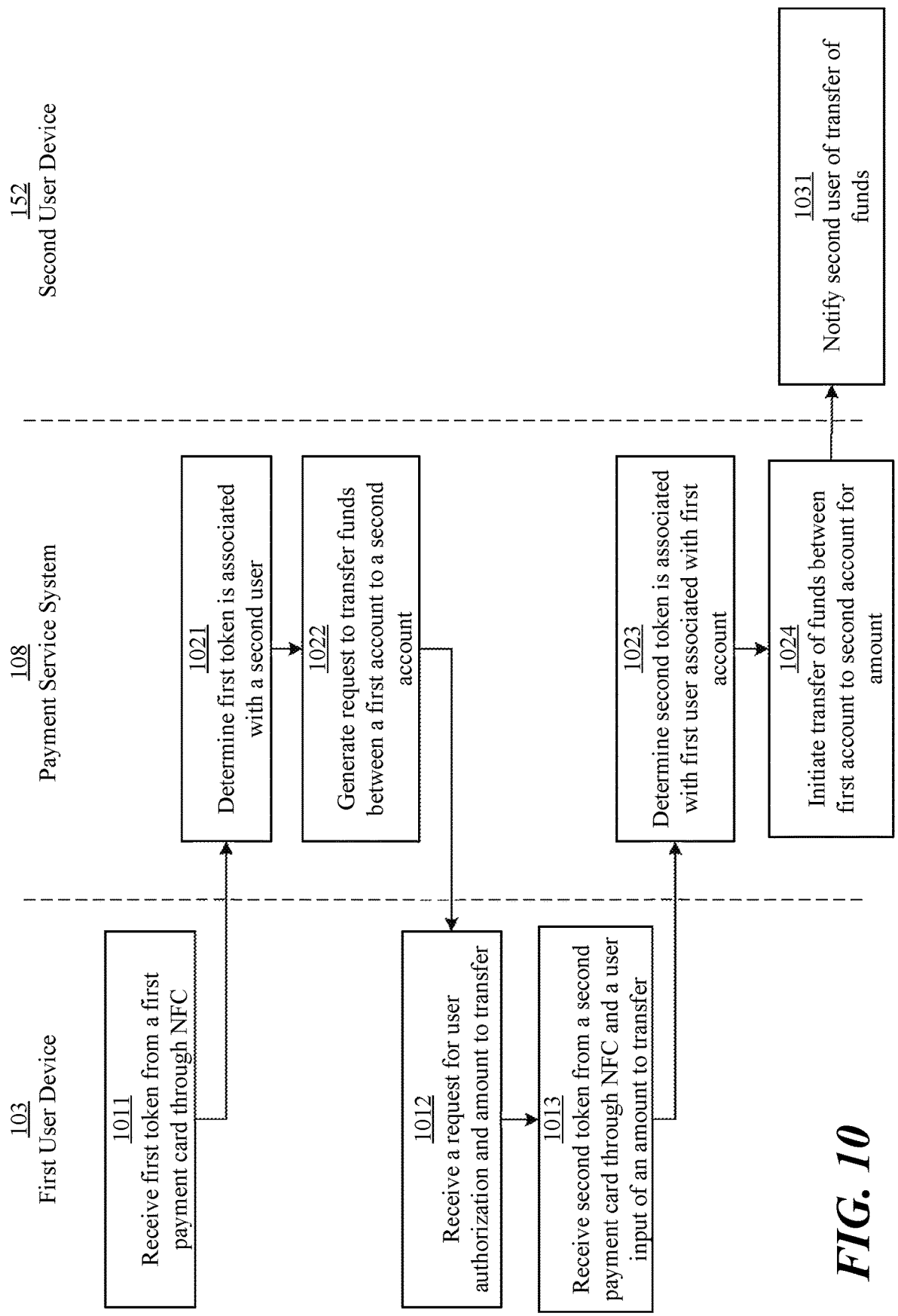
FIG. 10 illustrates an example method for initiating an account action based on receiving a token.

FIG. 10 illustrates the interactions between various actors, including a first user device 103, a payment service system 108, and a second user device 152 in a process for initiating an account action in response to receiving a token via NFC. In particular embodiments, the process may include determining whether to perform an action involving a two user account (e.g., performing a transaction between two users). In reviewing FIG. 10, the process generally advances as the blocks representing steps of the process proceed from the top of the figure downward so that, even if an arrow does not connect blocks, a first block (e.g., the block for step 1011) above a second block (e.g., the block for step 1022) will generally occur first in the process. Although FIG. 6 illustrates particular steps as being performed by particular devices, it will be understood that one or more illustrated steps may be performed by another device.

The process may begin at step 1011, in which a first user device 103 may receive a first token from a first payment card through NFC. As described herein, in particular embodiments, the user (e.g., recipient) may tap a first payment card (e.g., of the recipient) to an NFC reader of the first user device 103 (e.g., of the sender). The NFC reader may communicate with an NFC chip embedded in the first payment card. In particular embodiments, the NFC reader may perform applet selection to choose which of multiple applets running in parallel on the NFC chip of the payment card to run (e.g., a payment application and a customized NFC tag). In particular embodiments, the NFC reader may receive a token/NFC tag from the NFC chip. The NFC reader may decrypt and/or decode the token as necessary. As discussed previously with respect to FIG. 6, decrypting and/or decoding the token may encompass extracting particular information from the token. For example, the first user device 103 may extract information sufficient to identify the user associated with the token, such as a unique payment proxy (also referred to as a "cashtag") that uniquely identifies the user. The first user device 103 may send the first token to the payment service system 108 with a request to perform a transaction. At step 1021, the payment service system 108 may determine the first token is associated with a second user (e.g., recipient) that is not the owner of the financial account (e.g., of the sender) that is currently logged into a mobile application on the first user device 103. In particular embodiments, the payment service system 108 may access a database to determine a user account associated with the token. At step 1022, the payment service system 108 may generate a request to transfer funds between a first financial account to a second financial account. After generating the request, the payment service system 108 may send the request to the first user device 103 which presents the request to the user. In particular embodiments, the request may be presented as a notification. In particular embodiments, depending on the information determined by the first user device 103, the first user device may be capable of performing steps 1021-1022. For example, the first user device 103 may decrypt the token received via communication with the NFC chip embedded in the payment card and may compare user identifying information included in the token to user identifying information associated with the application executing on the first user device 103.

At step 1012, the first user device 103 may receive the request for user authorization and amount to transfer to the second financial account. In particular embodiments, the payment service system 108 may wait to receive the amount to transfer prior to sending the request for user authorization and the payment service system 108 may send the request for authorization separately from the request for amount to transfer. In particular embodiments, the payment service system 108 may send the request for authorization in response to determining the amount to transfer exceeds a threshold amount. At step 1013, the first user device 103 may receive a second token (e.g., of a sender) from a second payment card (e.g., of the sender) through NFC and a user input of an amount to transfer. In particular embodiments, a user (e.g., sender) may tap a second payment card to an NFC reader of the first user device 103. The first user device 103 may send the second token to the payment service system 108 after receiving the second token from the second payment card through NFC. At step 1023, the payment service system 108 may determine a second token is associated with the first user associated with the first financial account. In particular embodiments, the payment service system 108 may validate an association between the received second token and the financial account of the first user device 103 (e.g., the financial account of the user associated with the mobile application executing on the first user device 103. As an example and not by way of limitation, the payment service system 108 may compare the user account associated with the first user device 103 (sent or otherwise identified to the payment service system by the first user device 108 prior to step 1024) and the user account associated with the second token (e.g., retrieved from a database storing associations between payment card tokens and user accounts). The association is validated when the two user accounts match. After determining the second token is associated with the first user and validating the second token, the payment service system may interpret receiving the received second token as an indication of authorization. The payment service system 108 may initiate a transfer of funds between the first financial account to the second financial at step 1024. As with the first token, the first user device 103 may decode/decrypt some or all of the token received via communication with the NFC chip embedded in the second payment card. Based on the information determined from token, the first user device 103 may perform some or all components of steps 1023-1024. As an example only, the first user device 103 may compare user tokens (or unique payment proxies associated therewith) to determine the identity of the users and perform any requisite validation. The application executing on the first user device 103 may initiate the transfer request via communication with the payment service system 108 via one or more associated APIs. The API request may include the decrypted/decode user tokens and unique payment proxies and other essential information. After initiating the transfer of funds between the first financial account (e.g., of the sender) and the second financial account (e.g., of the recipient), the payment service system 108 may notify the second user device 152 (e.g., of the recipient). Then, at step 1031, the second user device 152 may notify the second user of transfer of funds. The notification to the second user may show an updated balance of the second financial account. In particular embodiments, the payment service system 108 may notify the first user device 103 of a successful transfer of funds to the second user. The notification to the first user may show an updated balance of the first financial account.

Figure 11A:
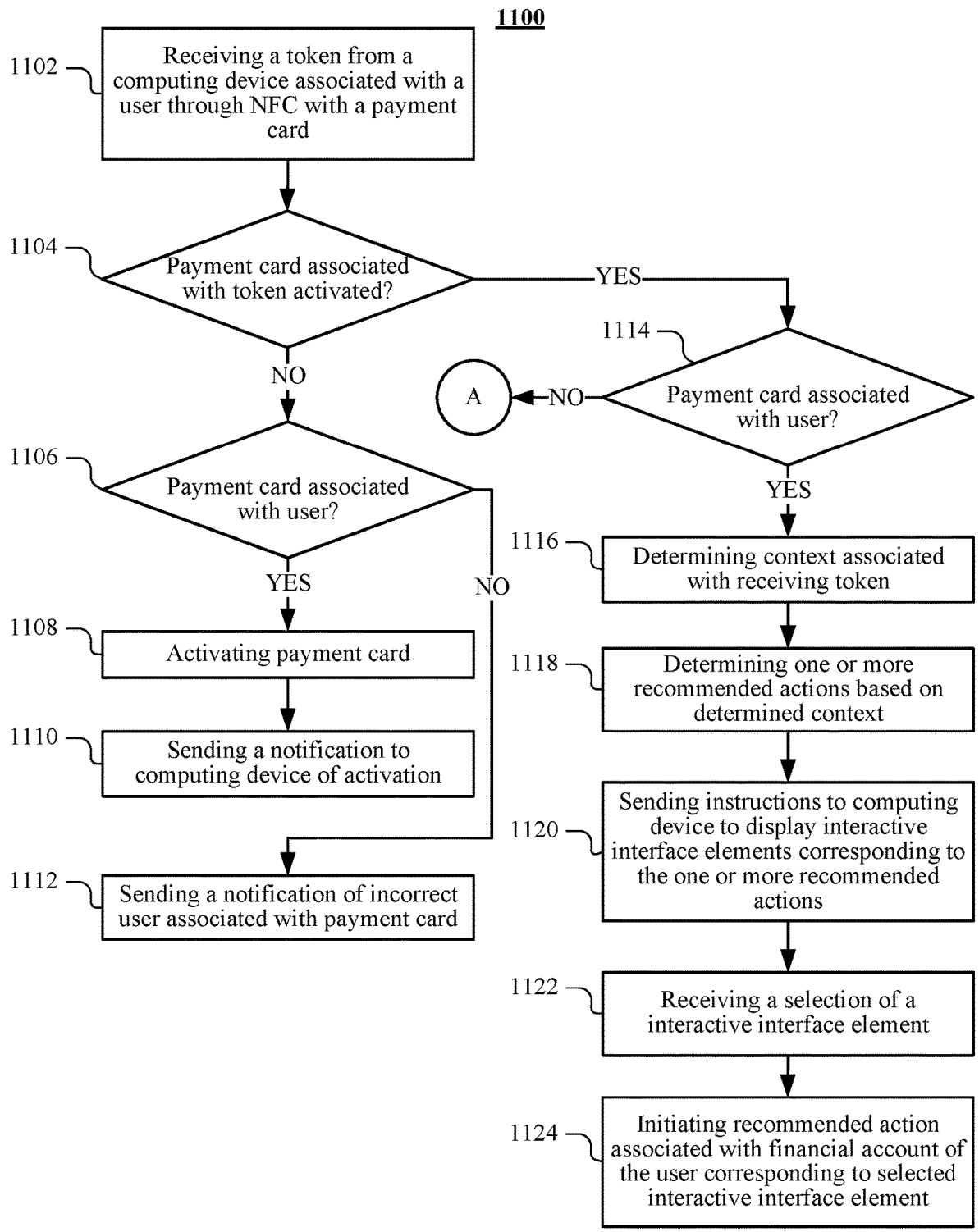
FIGS. 11A-11B illustrate an example method for initiating an account action based on receiving a token.
Figure 11B:
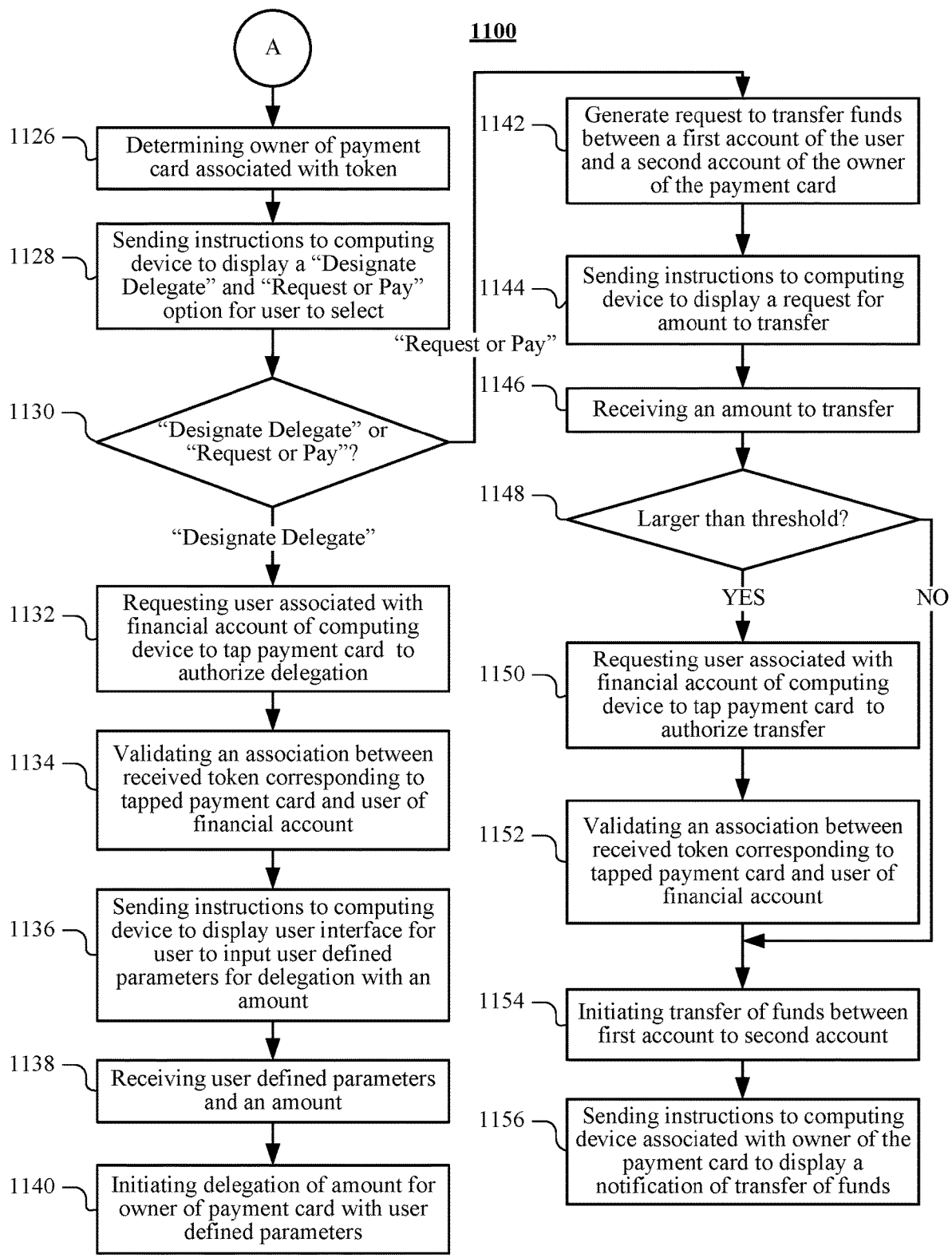

FIGS. 11A-11B illustrate an example method 1100 for initiating an account action based on a token received through NFC with a payment card. In particular embodiments, a payment service system 108 may store or be associated with storage of a plurality of tokens that are associated with a plurality of payment cards, respectively. In particular embodiments, the payment service system 108 may be associated with one or more instances of a payment application (e.g., payment application 107) executing on one or more user mobile devices (e.g., mobile device 103). Although this method is principally described as being performed by the payment service system 108, it should be understood that the method may be performed by a mobile device 103, where the mobile device 103 comprises an instance of a payment application 107 executing on the mobile device 103. The mobile device 103 may also being storing a database or other necessary data structure that comprises information necessary for the payment application 107 to perform the steps. The database may store a subset of the data accessible by the payment service system 108, for example, the data may only be information on users associated with the mobile 103 or who have previously interacted with the mobile device 103 (e.g., through causing an payment card embedded with a NFC chip to send information to the mobile device 103) or who have previously interacted with a user associated with the mobile device 103 (e.g., through transferring funds to our from the user, or through interactions on third-party systems).

The method may begin at step 1102, where the payment service system 108 may receive a token from a computing device associated with a user. The computing device may have received the token through NFC with a payment card. The notification may be received from a device associated with a user, such as a mobile device 103. The notification may be received through any suitable form of communication, including but not limited to, communication over one or more APIs, short message electronic mail, and through one or more wired or wireless connections. The token may be received from the computing device in response to a user tapping the NFC chip of the payment card to the NFC reader of the computing device or otherwise bringing an NFC chip of the payment card into a distance from the NFC reader of the computing device effective to allow the NFC reader to receive information from the NFC chip.

After receiving the token, at step 1104, the payment service system 108 may determine whether the payment card associated with the token is activated. That is, as described above, in particular embodiments, the payment service system may access a database of tokens and their assigned payment cards and users to determine whether a user has previously activated the payment card associated with the token for use with the payment service system 108.

If the payment service system 108 determines that the payment card associated with the token is not activated, then the method 1100 may proceed to step 1106, where the payment service system 108 may determine whether the payment card and token is associated with the user. The payment service system 108 may again access a database to perform a query to determine whether the payment card and token is assigned to the user account logged into the payment application 107 executing on the user device 103. If the payment service system 108 determines the payment card is associated with the user, then at step 1108, the payment service system 108 may activate the payment card. Subsequently, after the payment service system 108 activates the payment card, the payment service system 108 may send a notification to the computing device of activation of the payment card, which may be displayed to the user in step 1110. However, if the payment service system 108 determines the payment card is not associated with the user, then at step 1112, the payment service system 108 may send notifications based on the determination. For example, the payment service system 108 may send a notification to the user logged into the payment application 107 executing on the user device 103 informing the user that the card is associated with another user account. The payment service system 108 may alternatively or additionally send a notification to a computing device associated with the user with whom the payment card is associated informing the user that the payment card has been tagged by a computing device associated with another user.

If, at step 1104, the payment service system 108 determines that the payment card associated with the token is activated, then the method 1100 may proceed to step 1114, where the payment service system 108 determines whether the payment card is associated with the user account logged into the payment application 107 executing on the user device 103. In particular embodiments, to do so, the payment service system 108 may access and query a database to compare the user account associated with the payment card and token and the user account logged into the payment application 107 executing on the user device 103.

If the payment service system 108 determines that the payment card is associated with the user, then the method 1100 may proceed to step 1116, where the payment service system 108 determines the context associated with receiving the token. The context data may be determined initially by the payment application executing on the user device 103. In particular embodiments, the payment service system 108 may request context data from the user device 103 that sent the token. In particular embodiments, the user device 103 may send the context data to the payment service system 108 in addition to the token. In particular embodiments, as described above, the payment service system 108 and/or application executing on the user device 103 may identify a geographic location, a date and time, and other parameters associated with receiving the token to determine the context associated with receiving the token. The context data may also include stored instructions for the payment application or payment service system.

After determining the context associated with receiving the token, at step 1118, the payment service system 108 may determine one or more recommended actions based on the determined context and other information determined based on the token. For example, the token may include a set of stored instructions that may be set by the payment service or by one or more users associated with the payment card. In particular embodiments, the one or more recommended actions may comprise activation of a promotion for an entity, contacting customer support for the user account, performing an administrative function regarding the user account and the like. In particular embodiments, the payment service system 108 may identify nearby stores based on the geographic location and determine one or more recommended actions may be activating a promotion of a nearby store. In particular embodiments, the payment service system 108 may use contextual information, such as transactional data of the user, to identify frequently visited stores by the user. The payment service system 108 may then determine that the one or more recommended actions may be activating a promotion for the frequently visited stores. In particular embodiments, the payment service system 108 may use the transactional data of the user to identify a category of stores the user is interested in shopping at and determine that the one or more recommended actions may be activating a promotion for a store of the same category that the user is interested in shopping. In particular embodiments, the payment service system 108 may analyze the transaction data of the user and identify an uncharacteristic purchase by the user and determine that the one or more recommended actions may be calling customer support.

After one or more recommended actions are determined based on the determined context, at step 1120, the payment service system 108 may send instructions to the user device 103 to display interactive interface elements corresponding to the one or more recommended actions. As an example and not by way of limitation, the payment service system 108 may send instructions to the user device 103 to display promotions of nearby stores for the user to select. As another example and not by way of limitation, the payment service system 108 may send instructions to the user device 103 to display promotions of frequently visited stores. As another example and not by way of limitation, the payment service system 108 may send instructions to the user device 103 to display promotions of stores of the same category as stores the user is interested in shopping.

After displaying the interactive interface elements to the user, the user device 103 may receive a user input of one of the interactive interface elements through the payment application 107, and at step 1122, the payment service system 108 may receive an indication of the selection of the interactive interface element. After the indication is received, at step 1124, the payment service system 108 may initiate a recommended action associated with a financial account of the user corresponding to the selected interactive interface element. As an example and not by way of limitation, if the user selected to apply a promotion, the payment service system 108 may apply the promotion to the user's account.

If the payment card is not associated with the user account logged into the payment application 107 executing on the user device 103, at step 1126, the payment service system 108 may determine the owner of the payment card associated with the token, e.g., the user account associated with the payment card. In particular embodiments, the payment service system 108 may access and query a database to determine the user account associated with the token. In particular embodiments, the payment service system 108 may send instructions to the user device 103 to automatically populate a user interface with information regarding the determined user account associated with the token.

After determining the user account associated with the payment card, at step 1128, the payment service system 108 may send instructions to the user device 103 to display one or more interactive elements for the user's selection. For example, the interactive elements may correspond to different account actions that can be taken involving two user accounts, the account associated with the payment card and the account logged into the payment application 107 executing on the user device 103. In this example, the actions include an action to designate the user account associated with the user as a delegate with access to a specified amount of funds of the user account logged in to the payment application. The actions include an action to initiate a transaction between the two user accounts. Accordingly, the interactive elements include a "Designate Delegate" interactive element and a "Request or Pay" interactive element for the user to select. In particular embodiments, alternative or additional interactive elements may be included corresponding to other account actions between the two accounts. After sending the instructions, at step 1130, the payment service system 108 may wait to receive a user input on whether the user selected "Designate Delegate" or "Request or Pay".

If the user selected to "Designate Delegate", then the method 1100 may proceed to step 1132, where the payment service system 108 may request the user associated with the financial account logged into the payment application 107 executing on the user device 103 to authorize the action by tapping his or her payment card to the user device 103 bring the NFC chip of the payment card into communication with the NFC reader of the user device 103, allowing the token of the payment card to be identified and validated. After the user taps his or her payment card to the user device 103 to authorize the delegation process and the user device 103 sends over the token to the payment service system 108, then at step 1134, the payment service system 108 may validate an association between the received token corresponding to the tapped payment card and the user of the financial account. In particular embodiments, if the validation failed, the payment service system 108 may request the user to tap another payment card, provide another form of validation (e.g., through a secured passcode or biometrics) or terminate the process. In particular embodiments, the payment service system 108 may display a representation of a payment card associated with the financial account or a representation of the payment card which the payment service system 108 is requesting the user to tap to the user device 103 to authenticate the transaction via NFC.

After validating the association between the received token and the financial account, at step 1136, the payment service system 108 may send instructions to the user device 103 to display a user interface for the user to input user defined parameters for the action. The defined parameters may include a specification of an amount of funds to delegate. As described above, the user may also specify other user defined parameters, including a geographic location or merchant where the delegate may spend delegated funds or a time period in which the delegate may use the delegated funds. At step 1138, the payment service system 108 may receive the user defined parameters and the amount the user wishes to delegate to another user. After receiving the user defined parameters, at step 1140, the payment service system 108 may initiate delegation of an amount for the owner of the payment card with the user defined parameters. The delegate may use his or her payment card (e.g., the payment card that was used to interact with the user device 103) to access the delegated funds as if the funds were associated with the payment card.

If the user selected to "Request or Pay", then the method 1100 may proceed to step 1142, where the payment service system 108 may generate a request to transfer funds between a first account associated with the user logged into the payment application 107 executing on the user device 103 and a second account associated with the payment card. In particular embodiments, the user may specify whether the transaction will involve requesting an amount from or paying an amount to the owner of the payment card. At step 1144, the payment service system 108 may send instructions to the user device 103 to display a request for an amount to transfer between the two accounts. The request may include a recommended amount to transfer. At step 1146, the payment service system 108 may receive an amount to transfer between the two accounts from the user device 103. The user may be presented a user interface in the payment application 107 executing on the user device 103 that includes numerical buttons which the user may interact with to input the amount.

After the amount to transfer is received, at step 1148, the payment service system 108 may determine whether the amount is greater than a threshold amount. That is, the user or payment service system 108 may set a threshold amount where transactions exceeding the threshold amount cause the user to be notified and/or prompted for additional authorization. If the amount is greater than a threshold, then the method 1100 may proceed to step 1150, where the payment service system 108 may request the user associated with the financial account to indicate authorization of the transaction by tap his or her payment card to authorize the transfer. After receiving a token from the NFC chip embedded in in the payment card via NFC from the computing device, at step 1152, the payment service system 108 may validate an association between the received token corresponding to the tapped payment card and the user of the user device 103. As an example and not by way of limitation, the payment service system 108 may access and query a database to validate the association and ensure the token is assigned to the user. If the amount is not greater than a threshold amount or after step 1152, the method 1100 proceeds to step 1154, where the payment service system 108 may initiate a transfer of funds between the first financial account and the second financial account. After initiating the transfer of funds, at step 1156, the payment service system 108 may send instructions to computing devices associated with the both user accounts to display a notification of transfer of funds. In particular embodiments, the payment service system 108 may request the owner of the payment card to authorize the transfer of the funds before initiating the transfer of funds.

Although this disclosure describes and illustrates particular steps of the method of FIG. 11 as occurring in a particular order, this disclosure contemplates any suitable steps of the method of FIG. 11 occurring in any suitable order. Moreover, although this disclosure describes and illustrates an example method for initiating an account action based on receiving a token including the particular steps of the method of FIG. 11, this disclosure contemplates any suitable method for initiating an account action based on receiving a token including any suitable steps, which may include all, some, or none of the steps of the method of FIG. 11, where appropriate. Furthermore, although this disclosure describes and illustrates particular components, devices, or systems carrying out particular steps of the method of FIG. 11, this disclosure contemplates any suitable combination of any suitable components, devices, or systems carrying out any suitable steps of the method of FIG. 11. For example, although his disclosure describes steps of the method of FIG. 11 being performed by a payment service system 108, this disclosure contemplates that any of the steps of the method of FIG. 11 may be performed by a mobile device 103 executing an application associated with a payment service through, for example, local storage of relevant information where appropriate.

Figure 12:
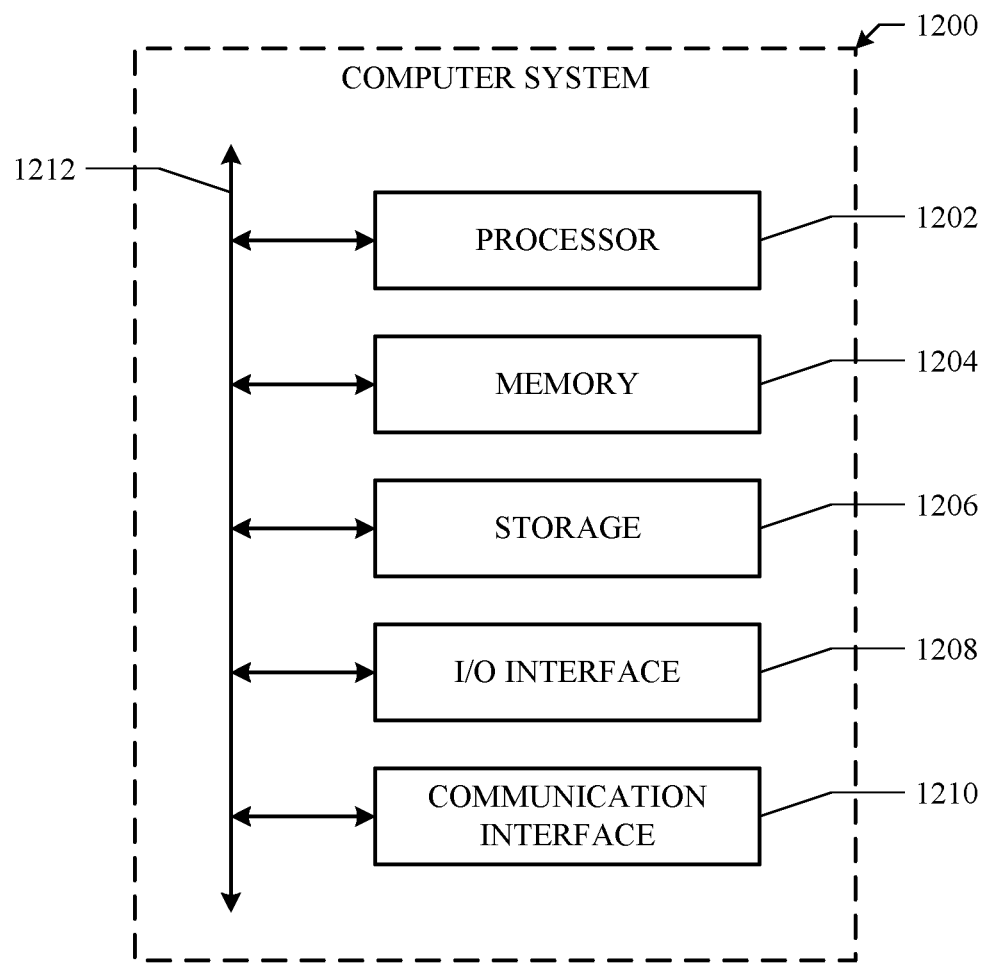
FIG. 12 illustrates an example computer system.

FIG. 12 illustrates an example computer system 1200. The computer system 1200 may be a computer system associated with the payment service system 108, POS device 105, or customer device 103. While these devices may have components in common, such as those illustrated in FIG. 12, it should be appreciated that each of the payment service system 108, POS device 105, or customer device 103 may be specialized devices configured for their specific purposes. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As an example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, executed by one or more computing devices associated with a payment service, comprising:
   receiving, from an application associated with the payment service and executing on a mobile device of a sender, a request to transfer funds from an account associated with the sender to an account associated with a recipient, wherein the accounts are managed by the payment service, wherein the request to transfer funds was generated by:
   receiving, at the mobile device of the sender via near-field communication (NFC) with a NFC-enabled payment card associated with the recipient, a first token, wherein the first token is programmed on an application executing on the NFC-enabled payment card associated with the recipient by the payment service, wherein the first token is operable to initiate the request to transfer funds to the recipient within the application associated with the payment service and executing on the mobile device of the sender in response to receiving the first token; and
   determining, by the application executing on the mobile device of the sender, that the first token is associated with the recipient;
   sending, in response to receiving the request to transfer funds, to the application executing on the mobile device of the sender, a request to authorize the request to transfer funds to the account associated with the recipient;

receiving, from the mobile device of the sender, an indication of authorization from the sender, wherein the indication of authorization is generated by:

receiving, at the mobile device of the sender through near-field communication with a NFC-enabled payment card associated with the sender, a second token, wherein the second token is programmed into an application executing on the NFC-enabled payment card associated with the sender by the payment service; and determining that the second token is associated with the sender; and initiating the transfer of funds between the respective accounts.

2. The method of claim 1, further comprising:

determining that the request to transfer funds requires security verification by the sender; and wherein the request to authorize the request to transfer funds to the account associated with the recipient comprises a prompt for security verification.

3. The method of claim 2, wherein determining that the request to transfer funds requires security verification by the sender comprises:

determining that an amount of funds specified in the request to transfer funds is greater than a threshold amount.

4. The method of claim 1, wherein the request to transfer funds is originated by the application executing on a mobile device of the recipient.

5. A method, executed by one or more computing devices associated with a payment service, comprising:

receiving, from a computing device of a first user, a request to perform an action between a first account associated with the first user and a second account associated with a second user, wherein the first account and the second account are maintained by the payment service, and wherein the request to perform the action was generated by:

receiving a first token at the computing device of the first user through near-field communication (NFC) with a first payment card, wherein the first token is operable to initiate the request to perform the action on the computing device of the first user in response to receiving the first token; and determining that the first token is associated with the second user;

receiving, from the computing device of the first user, an indication of authorization, wherein the indication of authorization is generated by:

receiving a second token at the computing device of the first user through near-field communication with a second payment card; and determining that the second token is associated with the first user; and initiating the action between the first account and the second account.

6. The method of claim 5, further comprising:

determining that the action requires security verification by the first user; and sending, in response to determining that the action requires security verification, to the computing device of the first user, a prompt for security verification.

7. The method of claim 5, wherein the request to perform the action comprises a payment request to transfer an amount of funds between the first account and the second account.

8. The method of claim 5, further comprising:

receiving, from a computing device of the second user, another indication of authorization, wherein the other indication of authorization is generated by:

receiving the first token at the computing device of the second user through near-field communication with the first payment card, wherein the computing device of the first user comprises a point of sale system and the computing device of the second user is a mobile computing device.

9. The method of claim 5, wherein the request to perform the action is originated by an application executing on the computing device of the first user.

10. The method of claim 5, wherein the request to perform the action is a request to authorize the second user to use a specified amount of funds of the first account, and wherein the request to authorize the second user to use a specified amount of funds comprises delegation parameters comprising one or more of:

a time of use restriction, a location of use restriction, or a merchant of use restriction.

11. A payment service system comprising:

one or more processors; and one or more computer-readable non-transitory storage media coupled to one or more of the processors and comprising instructions operable when executed by one or more of the processors to cause the payment service system to:

receive, from a computing device of a first user, a request to perform an action between a first account associated with the first user and a second account associated with a second user, wherein the first account and the second account are maintained by the payment service, and wherein the request to perform the action was generated by:

receive a first token at the computing device of the first user through near-field communication (NFC) with a first payment card, wherein the first token is operable to initiate the request to perform the action on the computing device of the first user in response to receiving the first token; and determine that the first token is associated with the second user;

receive, from the computing device of the first user, an indication of authorization, wherein the indication of authorization is generated by:

receive a second token at the computing device of the first user through near-field communication with a second payment card; and determine that the second token is associated with the first user; and initiate the action between the first account and the second account.

12. The payment service system of claim 11, wherein the instructions are further operable when executed by one or more of the processors to cause the payment service system to:

determine that the action requires security verification by the first user; and send, in response to determining that the action requires security verification, to the computing device of the first user, a prompt for security verification.

13. The payment service system of claim 11, wherein the request to perform the action comprises a payment request to transfer an amount of funds between the first account and the second account.

14. The payment service system of claim 11, wherein the instructions are further operable when executed by one or more of the processors to cause the payment service system to:
   receive, from a computing device of the second user, another indication of authorization, wherein the other indication of authorization is generated by:
      receiving the first token at the computing device of the second user through near-field communication with the first payment card, wherein the computing device of the first user comprises a point of sale system and the computing device of the second user is a mobile computing device.

15. The payment service system of claim 11, wherein the request to perform the action is originated by an application executing on the computing device of the first user.

16. One or more computer-readable non-transitory storage media embodying software that is operable when executed by one or more processors of a payment service system to:
   receive, from a computing device of a first user, a request to perform an action between a first account associated with the first user and a second account associated with a second user, wherein the first account and the second account are maintained by the payment service, and wherein the request to perform the action was generated by:
      receive a first token at the computing device of the first user through near-field communication (NFC) with a first payment card, wherein the first token is operable to initiate the request to perform the action on the computing device of the first user in response to receiving the first token; and
      determine that the first token is associated with the second user;
   receive, from the computing device of the first user, an indication of authorization, wherein the indication of authorization is generated by:
      receive a second token at the computing device of the first user through near-field communication with a second payment card; and
      determine that the second token is associated with the first user; and initiate the action between the first account and the second account.

17. The computer-readable non-transitory storage media of claim 16, wherein the software is further operable when executed by one or more processors of the payment service system to:
   determine that the action requires security verification by the first user; and
   send, in response to determining that the action requires security verification, to the computing device of the first user, a prompt for security verification.

18. The computer-readable non-transitory storage media of claim 16, wherein the request to perform the action comprises a payment request to transfer an amount of funds between the first account and the second account.

19. The computer-readable non-transitory storage media of claim 16, wherein the software is further operable when executed by one or more processors of the payment service system to:
   receive, from a computing device of the second user, another indication of authorization, wherein the other indication of authorization is generated by:
      receiving the first token at the computing device of the second user through near-field communication with the first payment card, wherein the computing device of the first user comprises a point of sale system and the computing device of the second user is a mobile computing device.

20. The computer-readable non-transitory storage media of claim 16, wherein the request to perform the action is originated by an application executing on the computing device of the first user.

* * * * *